(12) United States Patent
Fuchiwaki et al.

(10) Patent No.: US 10,424,298 B2
(45) Date of Patent: Sep. 24, 2019

(54) VOICE PROCESSING DEVICE

(71) Applicant: HONDA MOTOR CO., LTD., Minato-Ku, Tokyo (JP)

(72) Inventors: Yosuke Fuchiwaki, Wako (JP); Nobuaki Asahara, Wako (JP); Atsuyuki Suzuki, Wako (JP); Yusuke Nakamura, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 15/432,058

(22) Filed: Feb. 14, 2017

(65) Prior Publication Data
US 2017/0236510 A1 Aug. 17, 2017

(30) Foreign Application Priority Data

Feb. 17, 2016 (JP) .................................. 2016-027720

(51) Int. Cl.
*G10L 15/22* (2006.01)
*G10L 15/30* (2013.01)
*G06F 3/16* (2006.01)

(52) U.S. Cl.
CPC .............. *G10L 15/22* (2013.01); *G06F 3/167* (2013.01); *G10L 15/30* (2013.01); *G10L 2015/223* (2013.01)

(58) Field of Classification Search
CPC ... G10L 15/22; G10L 15/30; G10L 2015/223; G06F 3/165
See application file for complete search history.

(56) References Cited

U.S. PATENT DOCUMENTS

| 8,977,255 B2 * | 3/2015 | Freeman ........... H04M 1/72522 |
| | | 455/425 |
| 9,431,017 B2 * | 8/2016 | Kojima ................... G10L 15/22 |
| (Continued) |

FOREIGN PATENT DOCUMENTS

| JP | 2006-137366 A | 6/2006 |
| JP | 2009-020569 A | 1/2009 |
| KR | 10-1579537 B1 | 12/2015 |

OTHER PUBLICATIONS

Office Action, dated Jan. 22, 2018, issued in the corresponding Korean patent application No. 10-2017-0018436 and the English translation thereof.

*Primary Examiner* — Marcus T Riley
(74) *Attorney, Agent, or Firm* — Carrier Blackman & Associates, P.C.

(57) ABSTRACT

A voice processing device includes a voice recognition unit for extracting a command contained in an input voice, and a control unit for controlling operation of the voice processing device itself and/or instructing external devices to operate, based on the extracted command and/or operation instruction information provided. The control unit stores, in a storage device as an operation history, operation information associating the command or a part thereof and/or the operation instruction information or a part of the operation instruction information with details of the operation which is performed by the voice processing device and/or the external device based on the command and/or the operation instruction information. When a voice is input anew, the control unit extracts from the operation history an operation record containing a command or a part of a command, and controls operation of the voice processing device itself and/or instructs an external device to operate.

11 Claims, 12 Drawing Sheets

(56) References Cited

U.S. PATENT DOCUMENTS

| | | | | |
|---|---|---|---|---|
| 2003/0023435 | A1* | 1/2003 | Josephson | G10L 15/26 704/235 |
| 2008/0248797 | A1* | 10/2008 | Freeman | H04M 1/72522 455/425 |
| 2009/0253463 | A1* | 10/2009 | Shin | H04M 1/72583 455/563 |
| 2009/0254351 | A1* | 10/2009 | Shin | G06F 3/167 704/275 |
| 2009/0273659 | A1* | 11/2009 | Lee | H04N 7/147 348/14.02 |
| 2009/0306980 | A1* | 12/2009 | Shin | G06F 1/1624 704/235 |
| 2014/0142953 | A1* | 5/2014 | Kim | G10L 15/22 704/275 |
| 2014/0258324 | A1* | 9/2014 | Mauro | G06F 16/3329 707/766 |
| 2015/0287411 | A1* | 10/2015 | Kojima | G10L 15/22 704/246 |
| 2016/0372138 | A1* | 12/2016 | Shinkai | G10L 15/22 |
| 2017/0154626 | A1* | 6/2017 | Kim | G10L 15/22 |
| 2017/0236510 | A1* | 8/2017 | Fuchiwaki | G10L 15/22 704/251 |
| 2018/0239820 | A1* | 8/2018 | Jeong | H04N 21/41407 |
| 2018/0285065 | A1* | 10/2018 | Jeong | G10L 15/08 |
| 2018/0350364 | A1* | 12/2018 | Park | G06F 3/167 |
| 2019/0013024 | A1* | 1/2019 | Jeon | G06F 17/276 |
| 2019/0027140 | A1* | 1/2019 | Jeon | G10L 15/22 |
| 2019/0057684 | A1* | 2/2019 | Roh | G06F 3/167 |

* cited by examiner

FIG. 3

| Name of Items | Music Play Device | Connection Route | | Voice Recognition Function | Title of Musical Piece |
|---|---|---|---|---|---|
| | | Platform for Use | Communication IF | | |
| | Audio Unit 202 | Audio Unit 202 | Second Communication IF 242 | Not Used | musical piece 1 |
| | First External Device 110 | First External Device Control Unit 206 | Third Communication IF 244 | Overall Control Unit 200 | musical piece 2 |
| | Second External Device 112 | Second External Device Control Unit 208 | Fourth Communication IF 246 | Audio Unit 202 | musical piece 3 |
| Alternatives | Third External Device 114 | | | First External Device Control Unit 216 | ... |
| | Fourth External Device 116 | | | Second External Device Control Unit 218 | ... |
| | | | | First External Device 110 | ... |
| | | | | Second External Device 114 | ... |

FIG. 4

| Title of Musical Piece | Music Play Device (ID code) | Connection Route | | Voice Recognition Function (Used/Not Used or Device ID code) | Frequency (Times) | Last Date of Use |
|---|---|---|---|---|---|---|
| | | Platform for Use | Communication IF | | | |
| Title 1 | ID1-001 | First External Device Control Unit 206 | Third Communication IF 244 | First External Device Control Unit 216 | 10 | 8:03, Nov 1, 2015 |
| Title 2 | ID2-002 | Second External Device Control Unit 208 | Fourth Communication IF 246 | ID2-002 | 3 | 12:31, Nov 1, 2015 |
| Title 3 | ID3-003 | Audio Unit 202 | Fourth Communication IF 246 | Not Used | 1 | 7:58, Nov 3, 2015 |
| Title 4 | ID4-004 | Audio Unit 202 | Second Communication IF 242 | Audio Unit 202 | 2 | 8:30, Dec 15, 2014 |
| ... | ... | ... | ... | ... | ... | ... |
| Title 100 | ID2-006 | Audio Unit 202 | Second Communication IF 242 | ID2-006 | 15 | 18:12, Oct 26, 2015 |

FIG. 5

| Name of Items | Navigation Execution Device | Connection Route | | | Voice Recognition Function | Place Name of Destination |
|---|---|---|---|---|---|---|
| | | Platform for Use | Communication IF | | | |
| Alternatives | Navigation Unit 204 | Navigation Unit 204 | Second Communication IF 242 | | Not Used | place name a |
| | First External Device 110 | First External Device Control Unit 206 | Third Communication IF 244 | | Overall Control Unit 200 | place name b |
| | Second External Device 112 | Second External Device Control Unit 208 | Fourth Communication IF 246 | | NAvigation Unit 202 | place name c |
| | Third External Device 114 | | | | First External Device Control Unit 216 | ... |
| | Fourth External Device 116 | | | | Second External Device Control Unit 218 | ... |
| | | | | | First External Device 110 | |
| | | | | | Second External Device 114 | |

FIG. 6

| Title of Musical Piece | Music Play Device (ID code) | Connection Route | | Voice Recognition Function (Use/Not Use or Device ID code) | Frequency (Times) | Last date of Use | Direct Input | Automatic Play |
|---|---|---|---|---|---|---|---|---|
| | | Platform for Use | Communication IF | | | | | |
| Title 1 | ID1-001 | First External Device Control Unit 206 | Third Communication IF 244 | First External Device Control Unit 216 | 10 | 8:03, Nov 1, 2015 | No | No |
| Title 2 | ID2-002 | Second External Device Control Unit 208 | Fourth Communication IF 246 | ID2-002 | 3 | 12:31, Nov 1, 2015 | No | No |
| Title 3 | ID3-003 | Audio Unit 202 | Fourth Communication IF 246 | Not Use | 1 | 7:58, Nov 3, 2015 | No | Yes |
| Title 4 | ID4-004 | Audio Unit 202 | Second Communication IF 242 | Not Use | 2 | 8:30, Dec 15, 2014 | No | No |
| Title 5 | ID4-006 | Audio Unit 202 | Fourth Communication IF 246 | Not Use | 3 | 2015/9/22 15:30 | Yes | No |
| ... | ... | ... | ... | ... | ... | ... | ... | ... |
| Title 100 | ID2-006 | Audio Unit 202 | Second Communication IF 242 | Not Use | 15 | 18:12, Oct 26, 2015 | No | No |

| Title of Musical Piece | Music Play Device (ID code) | Connection Route | | Voice Recognition Function (Use/Not Use or Device ID code) | Frequency (Times) | Last date of Use | Direct Input | Automatic Play |
|---|---|---|---|---|---|---|---|---|
| | | Platform for Use | Communication IF | | | | | |
| Title 1 | ID1-001 | First External Device Control Unit 206 | Third Communication IF 244 | First External Device Control Unit 216 | 10 | 8:03, Nov 1, 2015 | No | No |
| Title 2 | ID2-002 | Second External Device Control Unit 208 | Fourth Communication IF 246 | ID2-002 | 3 | 12:31, Nov 1, 2015 | No | No |
| Title 3 | ID3-003 | Audio Unit 1002 | Fourth Communication IF 246 | Not Used | 1 | 7:58, Nov 3, 2015 | No | Yes |
| Title 4 | ID4-004 | Audio Unit 1002 | Second Communication IF 242 | Not Used | 2 | 8:30, Dec 15, 2014 | No | No |
| Title 5 | ID4-006 | Audio Unit 1002 | Fourth Communication IF 246 | Not Used | 3 | 15:30, Sep 22, 2015 | Yes | No |
| ... | | | ... | | | | | ... |
| Title 100 | ID2-006 | Audio Unit 1002 | Second Communication IF 242 | Not Used | 15 | 18:12, Oct 26, 2015 | No | No |

FIG. 11

VOICE PROCESSING DEVICE

FIELD OF THE INVENTION

The present invention relates to a voice processing device which executes some process in response to receiving a voice command from a user. More particularly, the present invention relates to the voice processing device which performs a voice recognition process on voice commands from a user and executes some process according to the command.

DESCRIPTION OF THE RELATED ART

As a conventional in-vehicle device which carry out a process relating voice recognition on a voice spoken by a user, Patent Document 1 discloses an in-vehicle traveling support apparatus which recognizes a user's voice, and references a plurality of dictionaries, each of which contains words related to the operation of a specific device such as audio equipment, an air conditioner, etc. The apparatus has a voice recognition unit which deduces, from the contents of a voice input from a driver, a target in-vehicle device which the driver intends to operate. The unit selects the dictionary dedicated to the deduced target device and performs voice recognition using the selected dictionary.

By the way, in recent years, an in-vehicle Audio Visual system is known, in which one or more mobile devices such as a smartphone brought into the vehicle is connected to an audio visual device (for example, a so-called display audio (DA) device) in the vehicle by wired communication or wireless communication. The functions of the mobile device and the audio visual device are provided to the user via in-vehicle HMI devices (microphone, loudspeaker, etc.) through cooperation of the mobile device and the audio visual device.

Some mobile devices to be connected to the audio visual device have functions similar to those of other in-vehicle devices and/or the audio visual devices themselves, such as a navigation function, a music play function, etc. Also there are mobile devices which can use multiple types of communication channels, such as USB (Universal Serial Bus), Bluetooth (registered trademark), etc.

Therefore, for example, with a plurality of mobile devices connected to the audio visual device, when playing a desired musical piece, it is necessary to input a command with various information into the audio visual apparatus, such as the identification of a device to be used to play the musical piece, a connection channel to be used between the device and the in-vehicle audio visual apparatus, in addition to the name of the musical piece. Further, there are in-vehicle AV systems (for example, Apple CarPlay (registered trademark), Android Auto (registered trademark)) which comprise an audio visual apparatus which realizes, by executing an application program therein, a dedicated platform to fully control a specific mobile device. In such a system in which multiple platforms are usable in the audio visual apparatus, the command for playing music, for example, needs to designate which platform is to be used.

Therefore, even if such an audio visual apparatus is provided with the same voice recognition function as that of the above-described conventional vehicle driving support apparatus, every time a user is going to play a musical piece, the user must input a voice command including designations of which device is to be used for playing the musical piece, the communication channel to the device, the platform for the device, etc. Consequently, a cumbersome redundant voice command is necessary, which makes the system less convenient.

In recent years, in addition to the speech recognition engine in an audio visual apparatus, that of each mobile device connected to the audio visual apparatus is also available and can be used. Therefore, it is necessary to manage their operation so that the speech recognition function of each device does not respond to a user's voice at the same time (i.e., to prevent operation of each device from conflicting with another). Further, in the case where an audio visual apparatus as a computer provides various functions by executing various applications, a voice recognition engine may be installed as software for each application (e.g., for each navigation application, or for each platform). In that case, overall operation management covering the speech recognition engines of the audio visual apparatus as well as those provided in the external mobile devices connected to the apparatus may be required.

As one method of solving conflicts in the voice recognition operation described above, it may be possible for a user to operate a switch to designate a voice recognition engine to be used (or designate a device having a voice recognition engine to be used). In such a case, however, it is necessary to operate the switch every time the user wants to change the device to be used (or each time the user speaks a command), which is not convenient.

As another method for solving conflicts in voice recognition operation, it may be possible to use only the voice recognition engine provided in the in-vehicle apparatus. In that case, however, the speech recognition is always performed using only the dictionary included in the in-vehicle apparatus. As a result, for example, when connecting and using a mobile device, the voice recognition dictionary which is implemented in and specialized for the connected mobile device cannot be used for function selection and/or function activation. Consequently, it may be difficult to input by voice detailed instructions and/or commands for settings on the connected device. That is, when using only one speech recognition engine as in the configuration of the above-described conventional apparatus, the use of voice commands optimized to the unique characteristics of each mobile device connected to the apparatus is restricted.

PRIOR ART DOCUMENT

Patent Document 1: JP2009-20569A

SUMMARY OF THE INVENTION

The Problems to be Solved

From the background described above, in a voice processing device which recognizes voice commands spoken by a user to control multiple external devices connected thereto it is desired that the execution of the speech recognition function of the voice processing device itself and those of the external devices are appropriately managed to enable simplified voice commands.

Solution of the Problem

One aspect of the invention is a voice processing device comprising a first voice recognition unit which recognizes the contents of an input voice to extract a command contained in the input voice, and a control unit for controlling operation of the voice processing device itself and/or for instructing an external devices to operate, based on the extracted command and/or operation instruction information provided. The control unit is configured to store in a storage device as an operation history operation information associating the command or a part of the command and/or the operation instruction information or a part of the operation instruction information with details of the operation which is performed by the voice processing device and/or the external device based on the command and/or the operation instruction information. The control unit is also configured to, when a voice is input anew, extract from the operation history an operation record containing a command or a part a command extracted by the first voice recognition unit, and control operation of the voice processing device itself and/or instruct the external devices to operate, based on said extracted command and the extracted operation record, wherein the operation record is a record of the operation information.

According to another aspect of the invention, the operation instruction information is provided from an operation input unit through which information is entered by a user operation.

According to another aspect of the invention, the control unit is configured to instruct the external device to operate by sending an operation instruction signal to instruct the external device to operate, and/or by sending the input voice to the external device if the external device has a voice recognition function and is connected with the voice processing device so that the voice processing device can send the voice.

According to another aspect of the invention, the voice processing device further comprises at least one second voice recognition unit other than the first voice recognition unit. And, the control unit controls operation of the voice processing device itself by sending the input voice to one of the second voice recognition units.

According to another aspect of the invention, when a number of the extracted operation records are more than one, the control unit selects one operation record among the extracted operation records according to a predefined condition, and controls operation of the voice processing device itself and/or instructs an external devices to operate, based on the extracted command and the selected one operation record.

According to another aspect of the invention, the operation information includes information about whether a corresponding operation is performed based on the voice recognition function of any of the second voice recognition units and the external device. The predefined condition is one specifying that the operation record about an operation performed based on the any voice recognition function is preferentially selected over the operation record about an operation performed not based on any voice recognition function.

According to another aspect of the invention, the operation information is related to a music play operation and includes information about whether a musical piece is played automatically. The predefined condition is one specifying that the operation record indicating that a played musical piece is not one which was played automatically is preferentially selected over the operation record indicating that a played musical piece is one which was played automatically.

According to another aspect of the invention, the control unit obtains, from the external device, information about details of operation performed by the external device in response to a voice command directly input to the external device and/or a user input operation directly input to the external device. And the control unit stores, in the storage device as the operation history, the operation information associating the voice command or a part of the voice command and/or information about the user input operation or a part of information about the user input operation with details of the operation which is performed by the external device based on the voice command and/or the user input operation.

According to another aspect of the invention, the predefined condition is one specifying that the operation record other than the operation record based on information obtained from the external device is preferentially selected over the operation record based on information obtained from the external device.

According to another aspect of the invention, the operation information includes identification information of the external device used for a corresponding operation and information about a connection route to said external device. Further, the control unit determines whether it is possible to send an operation instruction to the external device indicated by the identification information in the extracted operation record, through the same connection route as that indicated in the extracted operation record. And, if it is not possible, the control unit selects one alternative connection route according to a predefined condition and instruct the external device to operate using the selected alternative connection route.

According to another aspect of the invention, the operation information includes information about whether a corresponding operation is performed based on the voice recognition function of the external device. And, if the extracted operation record indicates that the corresponding operation is performed based on the voice recognition function of the external device, then a connection route capable of enabling the voice recognition function of the external device is selected as the alternative connection route.

BRIEF DESCRIPTION OF THE DRAWINGS

FIG. 3 shows an example of items and their alternatives for the operation information of music play operation in the voice processing device shown in FIG. 2.

FIG. 4 shows an example of the operation history of music play operation in the voice processing device shown in FIG. 2.

FIG. 5 shows an example of items and their alternatives for the operation information of navigation operation in the voice processing device shown in FIG. 2.

FIG. 6 shows an example of the operation history of navigation operation in the voice processing device shown in FIG. 2.

FIG. 11 shows an example of the operation history of music play operation in the voice processing device shown in FIG. 10.

DESCRIPTION OF THE EMBODIMENTS

Embodiments of the present invention will be described below with reference to the drawings.

Although the audio input processing apparatus according to the first and second embodiments described below can be realized as, for example, an audio visual apparatus (for example, so-called a display audio (DA) apparatus) mounted in a vehicle, the present invention is not limited to such an apparatus and can be widely applied to a voice processing device that controls a plurality of any apparatuses with voice commands.

First Embodiment

First, a voice processing device according to a first embodiment of the present invention will be described.

Figure 1:
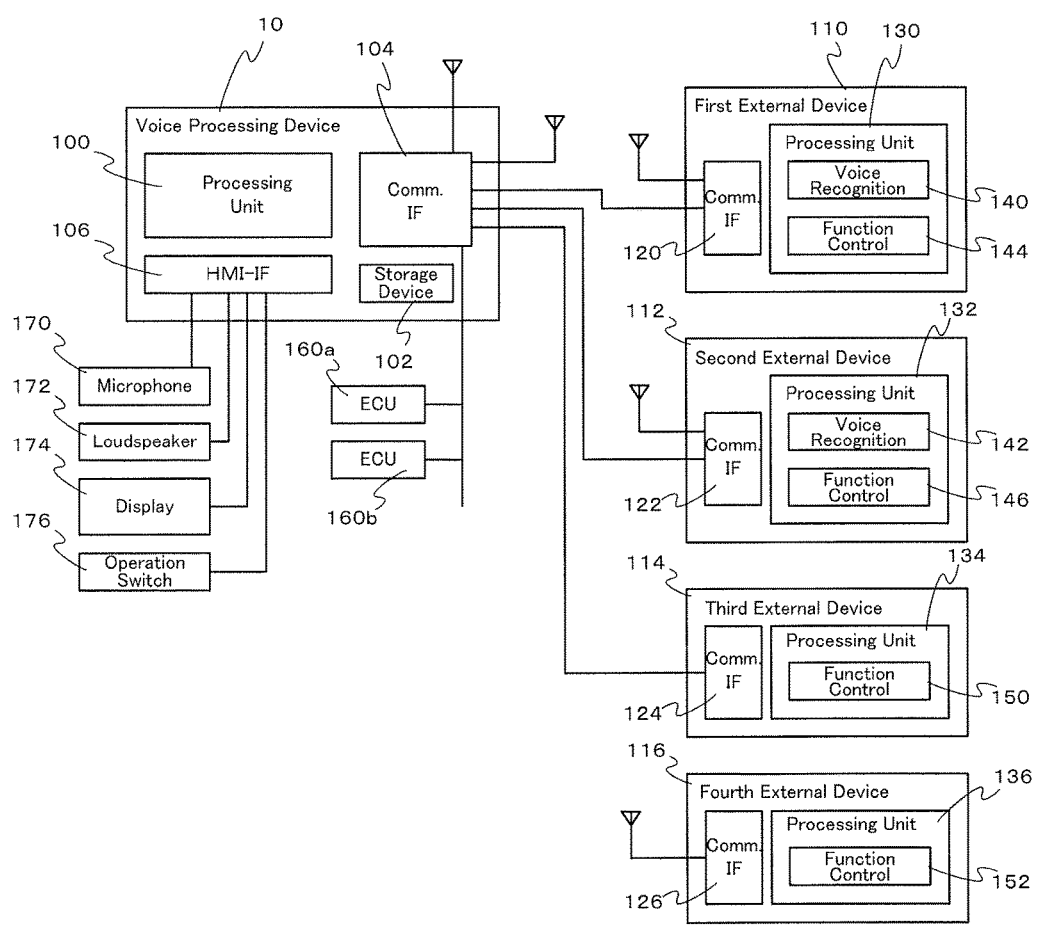
FIG. 1 shows an in-vehicle system using the voice processing device according to the first embodiment of the present invention.

FIG. 1 shows a configuration of an in-vehicle system using a voice processing device according to a first embodiment of the present invention.

The voice processing device 10 is mounted on a vehicle (hereinafter referred to as a host vehicle). The device 10 includes a processing unit 100, a storage device 102, and a communication interface (communication IF) 104 for communicating with a first external device 110, a second external device 112, a third external device 114 and a fourth external device 116 which are brought into the host vehicle.

Here, the first, second, third, and fourth external devices 110, 112, 114, 116 may be multi-function mobile terminals such as smartphones, and/or mobile terminals such as portable PCs (Personal Computers), etc. The first, second, third, and fourth external devices 110, 112, 114, 116 include communication interfaces (communication IF) 120, 122, 124 and 126 for communicating with the voice processing device 10, and include processing units 130, 132, 134, and 136, respectively.

The processing units 130, 132 of the first and second external devices 110, 112 include voice recognition units 140 and 142, respectively, which recognize a voice provided through microphones (not shown) of the respective external devices or through the communication IFs 120, 122. The processing units 130, 132 also include function control units 144 and 146 for controlling the functions of the respective external devices. The processing units 134, 136 of the third and fourth external devices 114, 116 have function control units 150, 152 for controlling the functions of the respective external devices.

In this embodiment, the first external device 110 is, for example, a multifunction mobile device iPhone (registered trademark), and is connected to the voice processing device 10 by Bluetooth and Lightning (registered trademark) cables. The second external device 112 is, for example, a multifunction mobile device Nexus (registered trademark), and is connected to the voice processing device 10 by Bluetooth and a USB cable. And, the third external device 114 and the fourth external device 116 are connected to the voice processing device 10 by USB cables and Bluetooth, respectively.

In this embodiment, the four external devices, namely, the first, second, third, and fourth external devices 110, 112, 114, 116 are connected to the voice processing device 10. However, the present invention is not limited to this configuration, but the voice processing device 10 may be connected to any number of external devices.

The voice processing device 10 also communicates (for example, performs CAN (Controller Area Network) bus communication) via the communication IF 104 with the electronic control units (ECUs) 160a and 160b provided in the host vehicle. The ECUs 160a and 160b execute some functions of the host vehicle (such as opening and closing the windows, turning on and off the wipers, turning on the headlamps, etc.). In this embodiment, the two ECUs 160a and 160b are connected to the voice processing device 10, but the present invention is not limited to this configuration, and the voice processing device 10 may be connected to any number of ECUs.

The voice input processing device 10 can also communicate with an external server (not shown) via the communication IF 104. For example, the voice processing device 10 can transmit an input voice to an external server and receive from the external server the result of voice recognition of the input voice performed by the server.

The voice processing device 10 also has an HMI interface (HMI-IF) 106 for communicating with human interface devices such as a microphone 170, a loudspeaker 172, a display 174, an operation switch 176, etc., which are mounted in the host vehicle.

The display 174 may include a liquid crystal display, for example, provided with a touch panel (not shown). The voice processing device 10 can receive information and commands entered by the user on the touch panel of the display 174 via the HMI-IF 106.

The operation switch 176 comprises one or more switches for the user to input instructions for the operation of the navigation unit 204, the ECUs 160a and 160b, and the first, second, third, and fourth external devices 110, 112, 114, 116. Note that the operation switch 176 may comprise buttons which are displayed on the display 174 and are turned on and off through the touch panel.

In the following description, information about the instructions for the operation of the navigation unit 204, the ECUs 160a, 160b, and the first, second, third, and fourth external devices 110, 112, 114, 116 which are input via the operation switch 176 and/or the touch panel of the display 174 are referred to as Operation Instruction Information. Here, the operation switch 176 and/or a touch panel (not shown) of the display 174 correspond to an operation input unit through which information is input by a user.

The processing units 130, 132, 134, 136 included in the first, second, third, and fourth external devices 110, 112, 114, 116 are, for example, computers each comprising a processor such as a CPU (Central Processing Unit), a ROM (Read Only Memory) in which a program is stored, a RAM (Random Access Memory) for temporary storage of data, etc. The speech recognition unit 140 and the function control unit 144 are realized by the processing device 130 executing a program. The speech recognition unit 142 and the function control unit 146 are realized by the processing device 132 executing a program. The function control units 150, 152 are realized by the processing units 134, 136 executing programs, respectively.

Figure 2:
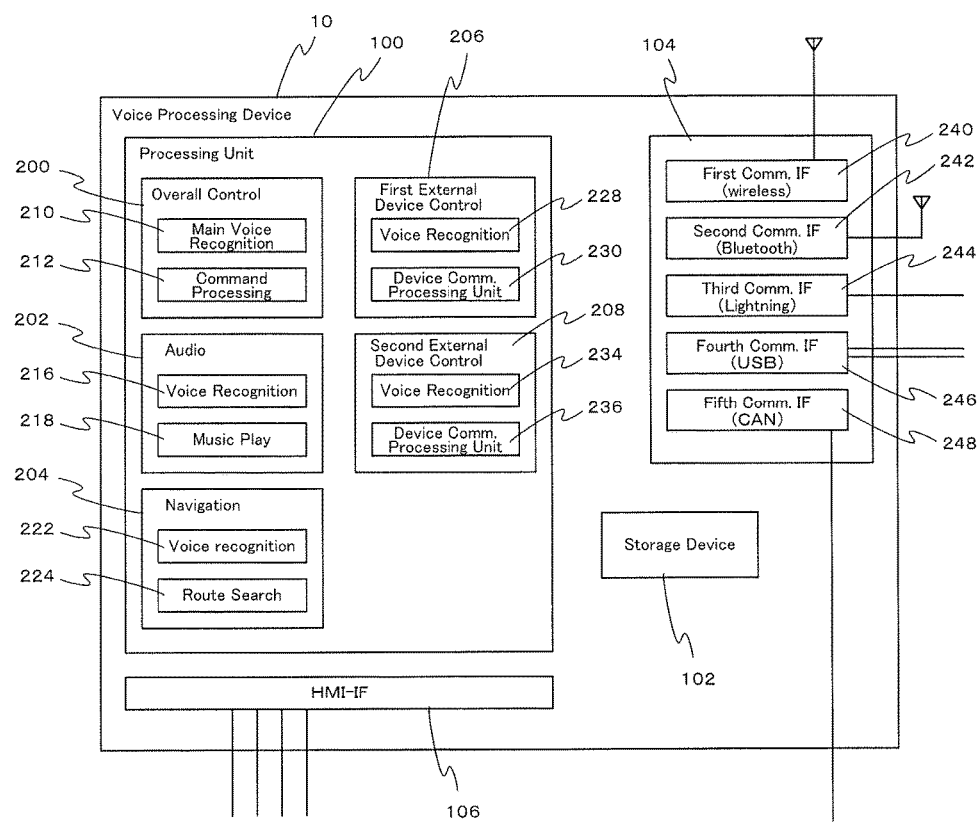
FIG. 2 shows a configuration of the voice processing device according to the first embodiment shown in FIG. 1.

FIG. 2 shows a configuration of the voice processing device 10 according to the first embodiment. The processing unit 100 of the voice processing device 10 is, for example, a computer having a processor such as a CPU, a ROM in which a program is stored, a RAM for temporary storage of data, etc. And, the processing unit 100 includes an overall control unit 200, an audio unit 202, a navigation unit 204, a first external device control unit 206, and a second external device control unit 208. Those units included in the processing unit 100 are realized, for example, by the processing device 100 executing a program.

The overall control unit 200 comprises a main voice recognition unit 210 and a command processing unit 212. The main voice recognition unit 210 stores the voice provided from the microphone 170 through the HMI-IF 106 into the storage device 102, executes a voice recognition process on the provided voice (input voice), and extracts a command from the input voice.

Based on the Operation Instruction Information provided from the operation switch 176, the command processing unit 212 inputs the voice acquired through the HMI-IF 106 from the microphone 170 into the main voice recognition unit 210, the audio unit 202, the navigation unit 204, the first external device control unit 206 and/or the second external device control unit 208, selectively. Also, the command processing unit 212 inputs the Operation Instruction Information provided from the touch panel of the display 174 into any one of the audio unit 202, the navigation unit 204, the first external device control unit 206, and/or the second external device control unit 208, selectively.

In addition, based on the command extracted by the main voice recognition unit 210 and based on the Operation Instruction Information obtained via the HMI-IF 106 from the operation switch 176 and/or the touch panel of the display 174, the command processing unit 212 instructs any of the audio unit 202, the navigation unit 204, the ECUs 160a and 160b, and the first, second, third, and fourth external devices 110, 112, 114, 116 to execute an operation determined by the extracted command and the Operation Instruction Information. Here, the execution instruction of the operation by the command processing unit 212 is performed by outputting a signal (operation instruction signal) for the instruction to the unit or device related to the operation (i.e., any of the audio unit 202, the navigation unit 204, the ECUs 160a and 160b, and the first, second, third, and fourth external devices 110, 112, 114, 116) and/or by outputting the input voice stored in the storage device 102 to a unit or device related to the operation (i.e., any of the audio unit 202, the navigation unit 204, and the first, and second external devices 110, 112).

Further, the command processing unit 212 has a function of outputting sound information and/or image information output from the first, second, third, and fourth external devices 110, 112, 114, 116 to the loudspeaker 172 and/or the display 174 via the HMI-IF 106.

The audio unit 202 is realized by the processing unit 100 executing an application program, and includes a voice recognition unit 216 and a music play unit 218. The voice recognition unit 216 performs voice recognition processing on input speech provided from the microphone 170 via the HMF-INF 106 or input speech provided from the command processing unit 212 of the overall control unit 200, and extracts an operation instruction(s) included in the input speech.

Based on the operation instruction extracted by the voice recognition unit 216 and/or the Operation Instruction Information input from the operation switch 176 or the touch panel of the display 174 and/or the operation signal given from the command processing unit 212 of the overall control unit 200, in accordance with the designations of a musical piece and of settings for the playing operation (equalizer setting, repeat setting, etc.) indicated by the operation instruction, the Operation Instruction Information, and/or the operation signal, the music play unit 218 may play the designated musical piece pre-stored in the storage device 102 or may instruct any of the first, second, third, and fourth external devices 110, 112, 114, 116 to play the designated musical piece. The played musical piece may be output from the loudspeaker 172 through the HMI-IF 106. That is, the audio unit 202 can operate as a device for playing a musical piece as well as operate as a platform for transmitting/receiving signals to/from the first, second, third, and fourth external devices 110, 112, 114, 116 which may play a musical piece.

The navigation unit 204 is realized by the processing unit 100 executing an application program, and includes a voice recognition unit 222 and a route search unit 224. The voice recognition unit 222 performs voice recognition processing on the input speech provided from the microphone 170 via the HMF-INF 106 or the input speech provided from the command processing unit 212 of the overall control unit 200, and extracts operation instructions included in the input speech.

Based on the operation instruction extracted by the voice recognition unit 222 and/or the Operation Instruction Information provided from the operation switch 176 or the touch panel of the display 174 and/or based on the operation signal given from the command processing unit 212 of the overall control unit 200, the route searching unit 224 searches a route to the destination indicated by the operation instruction, the Operation Instruction Information, and/or the operation signal, and performs guidance on the route using the display 174, etc.

The route searching unit 224 also functions as a platform to output the results of the route search performed by the first, second, third, and fourth external devices 110, 112, 114, 116 to the display 174, etc.

The first external device control unit 206 and the second external device control unit 208 are platforms for controlling the operation of external devices connected to the voice processing device 10 and are realized by the processing unit 100 executing application programs.

The first external device control unit 206 may be a platform of a CarPlay (registered trademark) system for controlling the operation of the multifunctional mobile terminal, iPhone (registered trademark), for example, and comprises a voice recognition unit 228 and a device communication processing unit 230. The voice recognition unit 228 performs voice recognition processing on input speech provided from the microphone 170 via the HMF-INF 106 or input speech provided from the command processing unit 212 of the overall control unit 200, and extracts operation instructions included in the input speech.

Based on the operation instruction extracted by the voice recognition unit 228, the Operation Instruction Information provided from the operation switch 176 or the touch panel of the display 174, and/or the operation signal provided from the command processing unit 212 of the overall control unit 200, the device communication processing unit 230 instructs the first external device 110 which is, for example, the multifunctional mobile terminal, iPhone (Registered trademark), via the third communication IF 244 (described later) which is, for example, a Lightning (registered trademark) cable connection interface, to execute the operation indicated by the operation instruction, the Operation Instruction Information, and/or the operation signal.

Further, the device communication processing unit 230 has a function of outputting, for example, sound information and/or image information output from the first external device 110 to the loudspeaker 172 and/or the display 174 via the HMI-IF 106.

The second external device control unit 208 is a platform of, for example, an Android Auto (registered trademark) system for controlling the operation of the multifunctional mobile terminal, Nexus (registered trademark), and includes a voice recognition unit 234 and a device communication processing unit 236. The voice recognition unit 234 performs voice recognition processing on the input speech provided from the microphone 170 via the HMF-INF 106 or the input speech provided from the command processing unit 212 of the overall control unit 200, and extracts operation instructions included in the input speech.

Based on the operation instruction extracted by the voice recognition unit 234, the Operation Instruction Information input from the operation switch 176 or the touch panel of the display 174, and/or based on the operation signal given from the command processing unit 212 of the overall control unit 200, the device communication processing unit 236 instructs the second external device 112 which is, for example, the multifunctional portable terminal, Nexus (registered trademark), through the fourth communication IF 246 (described later) which is, for example, a USB communication interface, or through the second communication IF 242 (described later) which is, for example, a Bluetooth (registered trademark) communication interface, to execute the operation indicated by the operation instruction, the Operation Instruction Information, and/or the operation signal.

Further, the device communication processing unit 236 has a function of outputting, for example, sound information and/or image information output from the second external device 112 to the loudspeaker 172 and/or the display 174 through the HMI-IF 106.

Here, the main voice recognition unit 210 included in the overall control unit 200 corresponds to the first voice recognition unit, and the voice recognition units 216, 222, 228, and 234 included in the audio unit 202, the navigation unit 204, the first and second external device control units 206, 208 correspond to the second voice recognition units.

The communication IF 104 includes a first communication IF 240 which is a wireless communication interface for communicating with an external (or remote) server via wireless communication, a second communication IF 242 which is, for example, a Bluetooth (registered trademark) communication interface, and a third communication IF 244 which is, for example, a Lightning (registered trademark) cable connection interface for communicating with a multifunctional mobile terminal, iPhone (registered trademark), a fourth communication IF 246 which is, for example, a USB communication interface, and a fifth communication IF 248 which is, for example, a CAN interface for communicating with the ECUs 160a and 160b.

In this embodiment, in order to make understanding easier by making the description concrete, it is assumed as an example that the first external device control unit 206 is a platform of the CarPlay (registered trademark) system, the second external device control unit 208 is a platform of the Android Auto (registered trademark) system, the first external device 110 is a multi-function portable terminal, iPhone (registered trademark), the second external device 112 is a multifunction portable terminal, Nexus (registered trademark), the second communication IF 242 is a Bluetooth (registered trademark) communication interface, the third communication IF 244 is a Lightning (registered trademark) cable connection interface, and the fourth communication IF 246 is a USB communication interface. Therefore, the first external device control unit 206, which is a platform of the CarPlay (registered trademark) system, communicates with the first external device 110, which is an iPhone (registered trademark), through only the third communication IF 244, which is a Lightning (registered trademark) cable connection interface, and the second external device control unit 208, which is a platform of the Android Auto (registered trademark) system, communicates with the second external device 112, which is a multifunctional portable terminal, Nexus (registered trademark), through the second communication IF 242, which is a USB communication interface or through the fourth communication IF 246, which is a Bluetooth (registered trademark) communication interface.

However, the first external device control unit 206 and the second external device control unit 208 are not limited to the above. The first external device control unit 206 and the second external device control unit 208 may establish, as a platform for controlling operation of external devices connected to the voice processing device 10, connections with one or more of the external devices through different multiple communication interfaces such as the second, third, and fourth communication IFs 242, 244, 246.

The operation of the processing unit 100 will be described taking as an example a case where the voice processing device 10 performs a music playing operation and a navigation operation as examples.

When performing a music playing operation, it is necessary to select the following, a device or a unit for playing, the signal connection route to the device or unit, etc., as shown in FIG. 3.

(A1) Concerning a device or unit for playing music (hereinafter also referred collectively to as a "music play device"), there may exist alternatives including an audio unit 202, the first external device 110, the second external device 112, the third external device 114, and the fourth external device 116.

(A2) The signal connection route to the music play device may be defined with a choice of a platform to be used (a platform of use) and a choice of a communication interface.

(A2-1) Alternatives of the platform of use may include the audio unit 202, the first external device control unit 206, the second external device control unit 208.

(A2-2) Alternatives of the communication interface may include the second communication IF 242 (e.g., Bluetooth communication interface), the third communication IF 244 (e.g., Lightning cable communication interface), the fourth communication IF 246 (e.g., USB communication interface).

(A3) Concerning the music play device, there may exist alternatives about whether to use voice commands, and if used, alternatives about which unit's or device's voice recognition function is to be used.

(A4) There may exist alternatives concerning a musical piece to be played (e.g., a title of the musical piece, a title of an album containing the musical piece, etc.). It should be noted that in FIG. 3 each of "musical piece 1", "musical piece 2", etc. shown as alternatives in the rightmost column "Title of Musical Piece" may be the name of any musical piece.

A user can input to the overall control unit 200 an instruction for playing music and a designation about alternatives concerning the above described matters (or items), as the Operation Instruction Information or a part of the Operation Instruction Information which the user may input through the operation switch 176 and/or the touch screen of the display 174 or as a voice command or a part of a voice command if voice commands are used (for example, the designation about a musical piece to be played may be input as a voice command or a part of a voice command, and the designation about alternatives of other matters may be input as the Operation Instruction Information or a part of the Operation Instruction Information).

Based on the designation about alternatives concerning each matter described above which are input as the Operation Instruction Information or a part of the Operation Instruction Information, or a voice command or a part of a voice command, the overall control unit 200 of the voice processing device 10 plays the designated musical piece using the audio unit 202 or one of the first, second, third, and fourth external devices 110, 112, 114, 116. And, when a Learning Mode operation is designated through e.g., the operation switch 176 or the touch screen of the display 174, the overall control unit 200 stores operation information indicating the title of the designated musical piece and details of the music play operation (e.g., the designation about the alternatives concerning the above described matters provided as the Operation Instruction Information or a part of the Operation Instruction Information and/or a voice command or a part of a voice command) into the storage device 102 as operation history.

FIG. 4 shows an example of the operation history about the music play operation. As shown in the two rightmost columns of a table in the figure, the operation history may include other items in addition to the items as shown in FIG. 3. For example, the operation history may include, for each musical piece, the number of times the same musical piece has been played using the same designation about the alternatives (shown in the second column "Frequency" from the right in the table of FIG. 4), and the last date of playing the same musical piece using the same designation about the alternatives (shown in the rightmost column "Last Date of Use" in the table of FIG. 4).

It can be seen from the row "Title 1" in FIG. 4, for example, that the musical piece of "Title 1" was played by the first external device 110, e.g., iPhone (registered trademark), having an ID code of ID1-001 (as indicated by the second column from the left of the table in the figure) connected via the third communication IF 244, e.g., Lightning cable communication interface (as indicated by the fourth column from the left of the table in the figure), through the platform provided by the first external device control unit 206 (e.g., the platform of CarPlay system) (as indicated by the third column from the left of the table in the figure). And it can be seen that to play the musical piece the voice recognition function provided by the first external device control unit 206 was used (as indicated by the fifth column from the left of the table in the figure). And also, it can be seen that the playing operation was executed at 8:03 on Nov. 1, 2015 (as indicated by the rightmost column of the table in the figure) and that the same playing operation was executed 10 times in the past (as indicated by the second column from the right of the table in the figure).

Similarly, it can be seen from the row "Title 2" of FIG. 4, for example, that the musical piece of "Title 2" was played by the second external device 112, e.g., Nexus (registered trademark), having an ID code of ID2-002 (as indicated by the second column from the left of the table in the figure) connected via the fourth communication IF 246, e.g., USB communication interface (as indicated by the fourth column from the left of the table in the figure), through the platform (e.g., the platform of Android Auto system) provided by the second external device control unit 208 (as indicated by the third column from the left of the table in the figure). And it can be seen that to play the musical piece the voice recognition function provided by the second external device control unit 208 was used (as indicated by the fifth column from the left of the table in the figure). And also, it can be seen that the playing operation was executed at 12:31 on Nov. 1, 2015 (as indicated by the rightmost column of the table in the figure) and that the same playing operation was executed 3 times in the past (as indicated by the second column from the right of the table in the figure).

Further, it can be seen from the row of "Title 100" of FIG. 4, for example, that the musical piece of "Title 100" was played by the second external device 112, e.g., Nexus (registered trademark), having an ID code of ID2-006 (as indicated by the second column from the left of the table in the figure) connected via the second communication IF 242, e.g., Bluetooth communication interface (as indicated by the fourth column from the left of the table in the figure), through the platform provided by the audio unit 202 (as indicated by the third column from the left of the table in the figure). And it can be seen that to play the musical piece the voice recognition function provided by the audio unit 202 itself having the ID code ID2-006 was used (as indicated by the fifth column from the left of the table in the figure). And also, it can be seen that the playing operation was executed at 18:12 on Oct. 26, 2015 (as indicated by the rightmost column of the table in the figure) and that the same playing operation was executed 15 times in the past (as indicated by the second column from the right of the table in the figure).

After the operation history as shown in FIG. 4 is stored and if an "Operation Mode" operation is designated through e.g., the operation switch 176 or the touch screen of the display 174, when a user instructs by voice to play a particular musical piece, the overall control unit 200 performs voice recognition on the voice from the user with the main voice recognition unit 210 to extract a designation of the musical piece, and extracts from the operation history a record of the operation information (hereinafter also referred to as an "operation record") including the musical piece. And then, the overall control unit 200 plays the designated musical piece according to the designation about the alternatives for each matter indicated by the extracted operation record.

Thereby, while enabling the use of simplified voice commands (e.g., the voice commands specifying only the title of a musical piece that the user wants to play), the voice processing device 10 according to the present embodiment may prevent conflict between the operation of the voice recognition functions of its own (e.g., those performed by the voice recognition units 210, 216, 222, 228, 234) and the voice recognition functions of the external devices (e.g., those performed by the voice recognition units 140, 142 in the first and second external devices 110, 112) and manage properly the execution of those functions.

Similarly, when executing a navigation function, it is necessary to make selections on the following matters concerning a device or unit to be used for the navigation, a signal connection route to the device, etc., as shown in FIG. 5.

(B1) Concerning a device or unit to be used for navigation (hereinafter also referred collectively to as a "navigation execution device"), there may exist alternatives including an navigation unit 204, the first external device 110, the second external device 112, the third external device 114, and the fourth external device 116.

(B2) If any one of the first, second, third, and fourth external devices 110, 112, 114, 116, 118 is selected as the navigation execution device, the signal connection route to the navigation execution device may be defined with a choice of a platform to be used (a platform of use) and a choice of a communication interface.

(B2-1) Alternatives of the platform of use may include the navigation unit 204, the first external device control unit 206, the second external device control unit 208.

(B2-2) Alternatives of the communication interface may include the second communication IF 242 (e.g., Bluetooth communication interface), the third communication IF 244 (e.g., Lightning cable communication interface), the fourth communication IF 246 (e.g., USB communication interface).

(B3) Concerning the navigation execution device, there may exist alternatives about whether to use voice commands, and if used, alternatives about which unit's or device's voice recognition function is to be used.

(B4) There may exist alternatives concerning a destination to be used in the navigation and a searching condition of a route to the destination (e.g., distance preference condition, time preference condition, etc.). It should be noted that in FIG. 5 each of "place name a", "place name b", etc. shown as alternatives in the rightmost column "Place Name of Destination" may be the name of any place.

A user can input to the overall control unit 200 an instruction for execution of a navigation operation and designation about alternatives concerning each of the above described matters as the Operation Instruction Information or a part of the Operation Instruction Information which the user may input through the operation switch 176 and/or the touch screen of the display 174, and/or as a voice command or a part of a voice command if voice commands are used (for example, the user may input a destination as a voice command or a part of a voice command and may input the designation of the alternatives of other matters as the Operation Instruction Information or a part of the Operation Instruction Information).

Based on the designation about alternatives concerning each matter described above which are input as the Operation Instruction Information or a part of the Operation Instruction Information and/or as a voice command or a part of a voice command, the overall control unit 200 of the voice processing device 10 searches for a route to the designated destination and performs route guidance according to the route found, by itself or by using any one of the external devices. And also, when a Learning Mode operation is designated through e.g., the operation switch 176 or the touch screen of the display 174, the overall control unit 200 stores in storage device 102 as an action history the designated destination and the operation information indicating the details of the executed navigation operation (e.g., the designation about the alternatives concerning the above described matters which was input as the Operation Instruction Information or a part of the Operation Instruction Information and/or as a voice command or a part of a voice command).

FIG. 6 shows an example of the operation history about the navigation operation. As shown in the two rightmost rows of the table in the figure, the operation history may also include other items than those shown in FIG. 5, such as the number of operations executed using the same destination and the same designation about the alternatives (shown in the second column from the right "Frequency" in the table of FIG. 6), and the last date of executing the navigation operation to the same destination using the same designation about the alternatives (shown in the rightmost column "Last Date of Use" in the table of FIG. 6).

It can be seen from the row of "Place Name a" in FIG. 6, for example, that the navigation operation to the destination of "Place Name a" was executed by using the navigation unit 204 (as indicated by the second column from the left of the table in the figure). And it can be seen that to execute the navigation operation the voice recognition function provided by the navigation unit 204 was used (as indicated by the fifth column from the left of the table in the figure), that the navigation operation was executed at 8:03 on Nov. 1, 2015 (as indicated by the rightmost column of the table in the figure), and that the similar navigation operation was executed 10 times in the past (as indicated by the second column from the right of the table in the figure).

And, it can be seen from the row of "Place Name b" of FIG. 6, for example, that the navigation operation to the destination of "Place Name b" was executed by the first external device 110, e.g., iPhone (registered trademark) device, having an ID code of ID1-001 (as indicated by the second column from the left of the table in the figure) connected via the third communication IF 244, e.g., Lightning cable communication interface (as indicated by the fourth column from the left of the table in the figure), through the platform provided by the first external device control unit 206 (e.g., the platform of CarPlay system) (as indicated by the third column from the left of the table in the figure). And also, it can be seen that to execute the navigation operation the voice recognition function provided by the first external device control unit 206 was used (as indicated by the fifth column from the left of the table in the figure) and that the navigation operation was executed at 12:31 on Nov. 1, 2015 (as indicated by the rightmost column of the table in the figure). In addition, it can be seen that the same navigation operation was executed 3 times in the past (as indicated by the second column from the right of the table in the figure).

Further, it can be seen from the row of "Place Name c" in FIG. 6, for example, that the navigation operation to the destination of "Place Name c" was executed by the second external device 112, e.g., Nexus (registered trademark) device, having an ID code of ID2-002 (as indicated by the second column from the left of the table in the figure) connected via the fourth communication IF 246, e.g., USB communication interface (as indicated by the fourth column from the left of the table in the figure), through the platform provided by the second external device control unit 208 (e.g., the platform of Android Auto system) (as indicated by the third column from the left of the table in the figure). And also it can be seen that to execute the navigation operation the voice recognition function provided by the second external device control unit 208 was used (as indicated by the fifth column from the left of the table in the figure), that the navigation operation was executed at 7:58 on Nov. 3, 2015 (as indicated by the rightmost column of the table in the figure), and that the same navigation operation was executed 30 times in the past (as indicated by the second column from the right of the table in the figure).

After the operation history as shown in FIG. 6 is stored and if an "Operation Mode" operation is designated through e.g., the operation switch 176 or the touch screen of the display 174, when a user specifies a particular destination by voice, the overall control unit 200 performs voice recognition on the voice from the user with the main voice recognition unit 210 to extract the destination, and extracts from the operation history an operation record (i.e., a record of the operation information) including the destination. And then, the overall control unit 200 executes a route search and route guidance to the destination according to the designation about the alternatives for each matter indicated by the extracted operation record.

Thereby, while enabling the use of simplified voice commands (e.g., the voice commands specifying only the destination), the voice processing device 10 according to the present embodiment may prevent conflict between the operation of the voice recognition function of its own (e.g., those performed by the voice recognition units 210, 216, 222, 228, 234) and the voice recognition function of the external devices (e.g., those performed by the voice recognition units 140, 142 in the first and second external devices 110, 112) and manage properly the execution of those functions.

As described above, based on the Operation Instruction Information provided through the operation switch 176 and/or the touch screen of the display 174 and/or based on the command extracted from the voice command, the command processing unit 212 of the overall control unit 200 controls operations of the voice processing device 10 itself (such as the operations of the audio unit 202 and the navigation unit 204) and/or operations of the first, second, third, fourth external devices 110, 112, 114, 116. And also, the command processing unit 212 stores into the storage device 102 as the operation history the operation information which associates the Operation Instruction Information or a part of the Operation Instruction Information and/or a command or a part of a command (e.g., a title of a musical piece that the user want to play, and/or the destination to be used for the route search) with the details of the operation executed by the voice processing device 10 itself and/or by the first, second, third, fourth external devices 110, 112, 114, 116 according to the Operation Instruction Information and/or the command And, when any voice is input anew, the command processing unit 212 extracts from the operation history stored in the storage device 102 the operation record (i.e., a record of the operation information) which includes a command or a part of a command extracted with the main voice recognition unit 210 (e.g., a title of a musical piece that the user wants to play, and/or the destination to be used for the route search). And then, based on the extracted command and the extracted operation record, the unit 212 controls the operations of the voice processing device 10 itself (e.g., the operation of the audio unit 202 and/or the navigation unit 204) and/or instructs any of the external devices 110, 112, 114, 116 to operate.

Next, a procedure of a process in the overall control unit 200 of the voice processing device 10 will be described with reference to a flow diagram shown in FIG. 7. The process starts when the voice processing device 10 is turned on, and terminates when the device 10 is turned off.

When processing starts, the overall control unit 200 determines first whether any voice is received through the HMI-IF 106 from the microphone 170 (S100), and if none is received (S100, No), the unit 200 returns to step S100 and waits for reception of any voice. For example, the command processing unit 212 of the overall control unit 200 may buffer sound data received from the microphone 170 in a temporary memory (not shown) and may determine by performing frequency analysis on the buffered sound data whether the buffered sound data includes any voice.

If any voice is received in step S100 (S100, Yes), it is determined whether the Operation Mode operation is designated through the operation switch 176 or the touch screen of the display 174 (S102). And, if the Learning Mode is designated, not the Operation Mode (S102, No), a command included in the received voice is extracted by the main voice recognition unit 210 and a designated operation is executed based on the extracted command and the Operation Instruction Information input through the operation switch 176 or the touch screen of the display 174 (S104). And, an operation record (i.e., a record of the operation information) about the executed operation is stored as the operation history into the storage device 102 (S106), and the process goes back to step S100 to repeat the procedure above.

If in step S102 the Operation Mode operation is determined to be designated through the operation switch 176 or the touch screen of the display 174 (S102, Yes), the command processing unit 212 sends the voice (an input voice) received in step S100 into the main voice recognition unit 210 (e.g., after extracting the input voice from the buffered sound above) and the main voice recognition unit 210 stores the input voice into the storage device 102 (S108). Then, the main voice recognition unit 210 executes the voice recognition process on the input voice to extract a command from the input voice and determine the function designated by the extracted command (i.e., the function which the extracted command instructs to execute)(S110). For example, the main voice recognition unit 210 may determine the function designated by the command (a designated function) by extracting predefined words and/or phrases (e.g., the phrase "play . . . " for instructing execution of the music playing function, or the phrase "search for a route to . . . " for instructing execution of the navigation function, or the phrase "turn on the windshield wiper" for instructing to start operation of the wiper as a part of vehicle operation).

Then, the command processing unit 212 determines whether the designated function relates to vehicle operation (for example, start operation of the wiper, opening and closing of the window, etc.) (S112), and if yes (S112, Yes), the unit 212 further determines a more specific operation (for example, start operation of the wiper, opening and closing of the window, etc.) of the designated function (S114) and sends a command indicating the determined specific operation (for example, in the form of a signal instructing execution of the specific operation) to a corresponding ECU (e.g., ECU 160a) through the fifth communication IF 248 (S116). And then, the unit 212 goes back to step S100 to repeat the procedure above.

If in step S112 the designated function is not one relating to the vehicle operation (S112, No), the command processing unit 212 further determines whether the designated function is an audio play function (e.g., a music play function) (S118), and if yes (S118, yes), then the unit 212 executes the Audio Play Process (S120) which will be detailed below, and goes back to step S100 to repeat the procedure above.

If in step S118 the designated function is not the audio play function (S118, No), then the command processing unit 212 further determines whether the designated function is navigation (S122), and if yes (S122, yes), then the unit 212 executes a Navigation Process (S124) which will be detailed below, and goes back to step S100 to repeat the procedure above.

If in step S122 the designated function is not navigation (S122, No), then the command processing unit 212 determines whether a connection to any external server having a voice recognition function can be established through e.g., the first communication IF 240 which is a wireless communication interface (S126). If yes (S126, Yes), the unit 212 transmits to the external server the input voice stored in step S108 into the storage device 102 (S128) and goes back to step S100 to repeat the procedure above. Thereby, the external server may perform any process based on the input voice and send back its result. Then, by receiving the result, the voice processing device 10 may execute any other process according to the input voice. Here, the determination whether a connection to the external server having a voice recognition function can be established may be performed by e.g., checking whether there is information about any external server having a voice recognition function among information about connectable external servers which is pre-stored in the command processing unit 212. That is, if there is information about any external server having a voice recognition function in the pre-stored information, it is determined that a connection to an external server having a voice recognition function can be established.

If in step S126 it is determined that a connection to any external server having a voice recognition function can not be established (S126, No), the command processing unit 212 determines whether one or more external devices having voice recognition function are connected through the communication IF 104 (S130). And, if yes (S130, Yes), the unit 212 sends the input voice stored in the storage device 102 in step S108 into one of the external devices having a voice recognition function (e.g., the first external device 110 or the second external device 112 in the first embodiment) (S132), and goes to step S100 to repeat the procedure above. Thereby, it is possible to execute any process according to the input voice with e.g., the external device to which said input voice is sent. Here, the external device to which the input voice is to be sent may be determined according to e.g., a priority order predefined or that designated by the user through the display 174 and/or the operation switch 176.

If in step S130 no external device having a voice recognition function is connected (S130, No), then the process goes back to step S100 to repeat the procedure above.

<Audio Play Process>

Next, a procedure of the Audio Play Process in step S120 of FIG. 7 will be described with reference to a flow diagram shown in FIG. 8.

When processing starts, the command processing unit 212 determines first whether the designated function is one relating to playing music (S200), and if no (S200, No), the unit 212 performs voice recognition on the whole input voice stored in step S108 into the storage device 102 (S202) and terminates this Audio Play Process. Alternatively or additionally, in step S202, if it is possible to establish a connection to any external server having a voice recognition function through the first communication IF 240, the input voice stored in the storage device 102 in step S108 may be sent to the external server to perform voice recognition on the input voice.

If in step S200 the designated function is one related to playing music (S200, Yes), a title of a designated musical piece to be played is extracted from the input voice stored in the storage device 102 in step S108 with the main voice recognition unit 210 (S204), and an operation record containing the title of the designated musical piece is searched for and extracted from the operation history of music play operation (e.g., the operation history as shown in FIG. 4) stored in the storage device 102 (S206).

Then, the command processing unit 212 determines whether there is an operation record containing the title of the designated musical piece (i.e., whether such operation record is extracted) (S208), and if no (S208, No), the process goes to step S202. If in step S208 the operation record(s) containing the title of the designated musical pieces is extracted (S208, Yes), it is determined whether more than one such operation record containing the title of the designated musical piece have been extracted (S210). And if yes (S210, Yes), one operation record is selected from the extracted operation records according to a predefined condition (S212), and the process goes to step S214. Here, the predefined condition may be, for example, "selecting one record having the largest 'Frequency' (i.e. having the largest number in the second column from the right 'Frequency' in the table of FIG. 4) among the extracted operation records", "selecting one record having the newest 'Last Date of Use' (i.e. having the newest date in the rightmost column 'Last Date of Use' of the table in FIG. 4) among the extracted operation records".

If in step S210 the extracted operation records containing the title of the designated musical piece are not more than one (i.e., only one such operation record is extracted), (S210, No), then the process goes to step S214.

In step S214, the command processing unit 212 determines whether a designated musical piece can be played according to the one operation record extracted in step S206 or selected in step S212 from the operation records extracted in step S206 (hereinafter referred to as simply an "extracted operation record") (S214). For example, in the case where the operation history shown in FIG. 4 is used and the musical piece having the title of "Title 1" is the designated musical piece, the operation record having "Title 1" in the leftmost column is extracted. In this case, if the device having the ID code of ID1-001 indicated in the extracted operation record is not connected to the communication IF 104 or, if it is connected but not through the third communication IF 244 as indicated in the extracted operation record, then it is determined to be impossible in step S214 to play the musical piece of "Title 1" according to the extracted operation record.

And, if in step S214 it is determined to be impossible to play the musical piece of "Title 1" according to the extracted operation record (S214, No), the process goes to step S202. On the other hand, if it is possible to play it according to the extracted operation record (S214, Yes), it is determined whether the extracted operation record indicates the use of any voice recognition function for playing the designated musical piece (S216). For example, if the table shown in FIG. 4 is used, this determination may be performed based on information indicated in the third column from the left "Voice Recognition Function" in the table.

Figure 7:
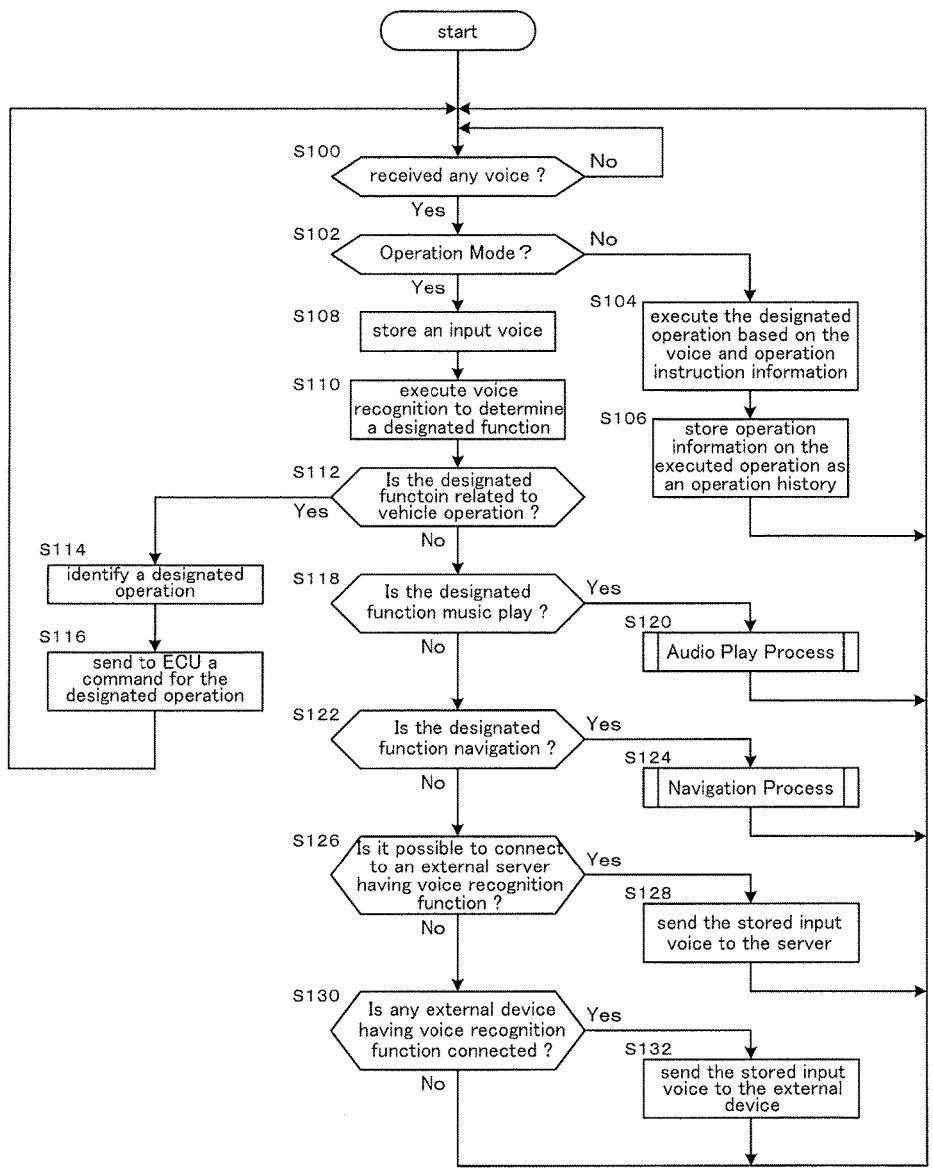
FIG. 7 is a flow diagram showing a process procedure in the overall control unit in the voice processing device shown in FIG. 2.

If the use of a voice recognition function is designated (S216, Yes), the input voice stored into the storage device 102 at step S108 in FIG. 7 is sent to the device or unit having voice recognition function indicated by the extracted operation record (e.g., the device or unit indicated in the third column from the left "Voice Recognition Function" in the table shown in FIG. 4) (S218), and the Audio Play Process terminates. Thereby, the audio play device which receives the input voice may execute voice recognition on the input voice and play the designated musical piece according to a command contained in the input voice.

If in step S216 the use of a voice recognition function is not designated in the extracted operation record (S216, No), an operation instruction signal for playing the designated musical piece with the designated music play device is generated according to the extracted operation record (S220). Then, the generated operation instruction signal is sent to the designated music play device through the connection route designated by the extracted operation record (S222), and the Audio Play Process terminates.

<Navigation Process>

Figure 9:
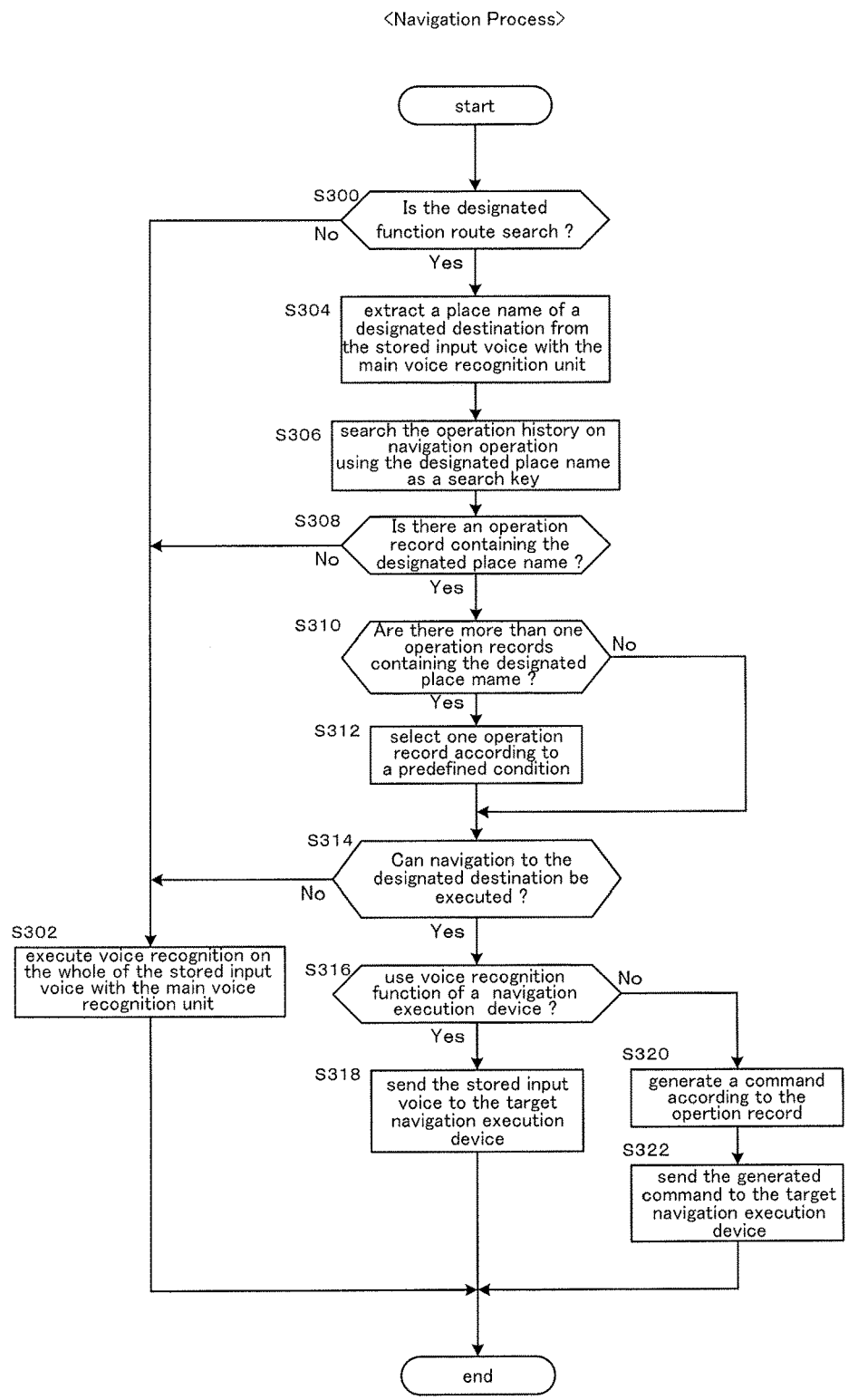
FIG. 9 is a flow diagram showing a procedure of the Navigation Process in the flow diagram shown in FIG. 7.

Next, a procedure of the Navigation Process in step S124 of FIG. 7 will be described with reference to a flow diagram shown in FIG. 9.

When processing starts, the command processing unit 212 determines first whether the function designated in step S110 is a route search (S300), and if no (S300, No), the unit 212 perform voice recognition with the main voice recognition unit 210 on the whole input voice stored in step S108 into the storage device 102 (S302) and terminates this Navigation Process. Alternatively or additionally, in step S302, if it is possible to establish a connection to any external server having a voice recognition function through the first communication IF 240, the input voice stored in the storage device 102 in step S108 may be sent to the external server to perform voice recognition on the input voice.

If in step S300 the designated function is a route search (S300, Yes), a place name of a destination designated to be used for the route search (a designated destination) is extracted from the input voice stored in the storage device 102 in step S108 with the main voice recognition unit 210 (S304), and the operation record containing the place name of the designated destination is searched for and extracted from the operation history of navigation operation (e.g., the operation history as shown in FIG. 6) stored in the storage device 102 (S306).

Then, the command processing unit 212 determines whether there is an operation record containing the place name of the designated destination (i.e., determines whether such an operation record is extracted) (S308), and if no (S308, No), the process goes to step S302. If in step S308 the operation record containing the place name of the designated destination is extracted (S308, Yes), it is determined whether more than one such operation record containing the place name of the designated destination is extracted (S310). And if yes (S310, Yes), one operation record is selected from the extracted operation records according to a predefined condition (S312), and the process goes to step S314. Here, the predefined condition may be, for example, "selecting one operation record having the largest 'Frequency' (i.e. having the largest number in the second column from the right, 'Frequency', in the table of FIG. 6) among the extracted operation records", or "selecting one operation record having the newest 'Last Date of Use' (i.e. having the newest date in the rightmost column 'Last Date of Use' of the table in FIG. 6) among the extracted operation records".

If in step S310 the extracted operation records containing the place name of the designated destination are not more than one (i.e., only one such operation record is extracted) (S310, No), then the process goes to step S314.

In step S314, the command processing unit 212 determines whether a navigation to the designated destination can be performed according to the one operation record extracted in step S306 or selected in step S312 from the operation records extracted in step S306 (hereinafter referred to as simply an "extracted operation record") (S314). For example, in the case where the operation history shown in FIG. 6 is used and a place indicated by "Place Name b" is the designated destination, the operation record having "Place Name b" in the leftmost column is extracted. In this case, if the device having the ID code of ID1-001 indicated in the extracted operation record is not connected to the communication IF 104 or, if it is connected but not through the third communication IF 244 as indicated in the extracted operation record, then it is determined to be impossible in step S314 to perform the navigation to the designated destination of "Place Name b" according to the extracted operation record.

And, if in step S314 it is determined to be impossible to perform the navigation to the designated destination according to the extracted operation record (S314, No), the process goes to step S302. On the other hand, if it is possible to perform the navigation according to the extracted operation record (S314, Yes), it is determined whether the extracted operation record indicates a use of any voice recognition function for executing the navigation (S316). For example, if the table shown in FIG. 6 is used, this determination may be performed based on information indicated in the third column from the left, "Voice Recognition Function", in the table.

If the use of a voice recognition function is designated (S316, Yes), the input voice stored into the storage device 102 at step S108 in FIG. 7 is sent to the device or unit having a voice recognition function indicated by the extracted operation record (e.g., the device or unit indicated in the third column from the left, "Voice Recognition Function", of the table shown in FIG. 6) (S318), and the Audio Play Process terminates. Thereby, the navigation device which receives the input voice may execute voice recognition on the input voice and perform the navigation to the designated destination according to a command contained in the input voice.

If in step S316 the use of a voice recognition function is not designated in the extracted operation record (S316, No), an operation instruction signal for performing the navigation to the designated destination with the designated navigation device is generated according to the extracted operation record (S320). Then, the generated operation instruction signal is sent to the designated navigation device through the connection route designated by the extracted operation record (S322), and the Navigation Process terminates.

Second Embodiment

Next, a voice processing device according to a second embodiment of the present invention will be described.

In the voice processing device according to the second embodiment, if in step S214 it is determined to be impossible to play the designated musical piece according to the extracted operation record and this is because a connection to the music play device can not be established through the connection route indicated in the extracted operation record, then an alternative (or substitute) connection route having functions similar to those of the indicated connection route in the extracted operation record is selected according to a pre-defined condition and the connection to the music play device is established through the selected alternative connection route.

Thereby, in the voice processing device according to the second embodiment, even in the case where the music play device can not be connected through a connection route indicated in the extracted operation record, an alternative connection route having similar functions to those of the indicated route is selected and is used to establish the connection to the music play device, which improves the convenience of the voice processing device.

And, the voice processing device according to the second embodiment obtains information about an operation executed by any one of the first, second, third, and fourth external devices 110, 112, 114, 116 based on a direct input to the corresponding external device (i.e., a voice command and/or an input operation which a user directly inputs to the corresponding external device) from the corresponding external device. And, the voice processing device stores as the operation history into the storage device 102 the operation information including the input voice command or a part of the input voice command and/or the input operation or a part of the input operation (e.g., a title of a designated musical piece for music play operation, a place name of destination used for a route search in navigation operation) associated with details of the operation performed by the corresponding external device based on said voice command and said input operation. Here, the operation information constituting the operation history includes direct input information indicative of whether an operation performed by any one of the first to fourth external devices is based on the direct input to the corresponding external device.

Further, in the voice processing device according to the second embodiment, the operation information constituting the operation history includes automatic play information indicative of whether the played musical piece was one which was played automatically as e.g., a musical piece contained in a music album.

Figure 8:
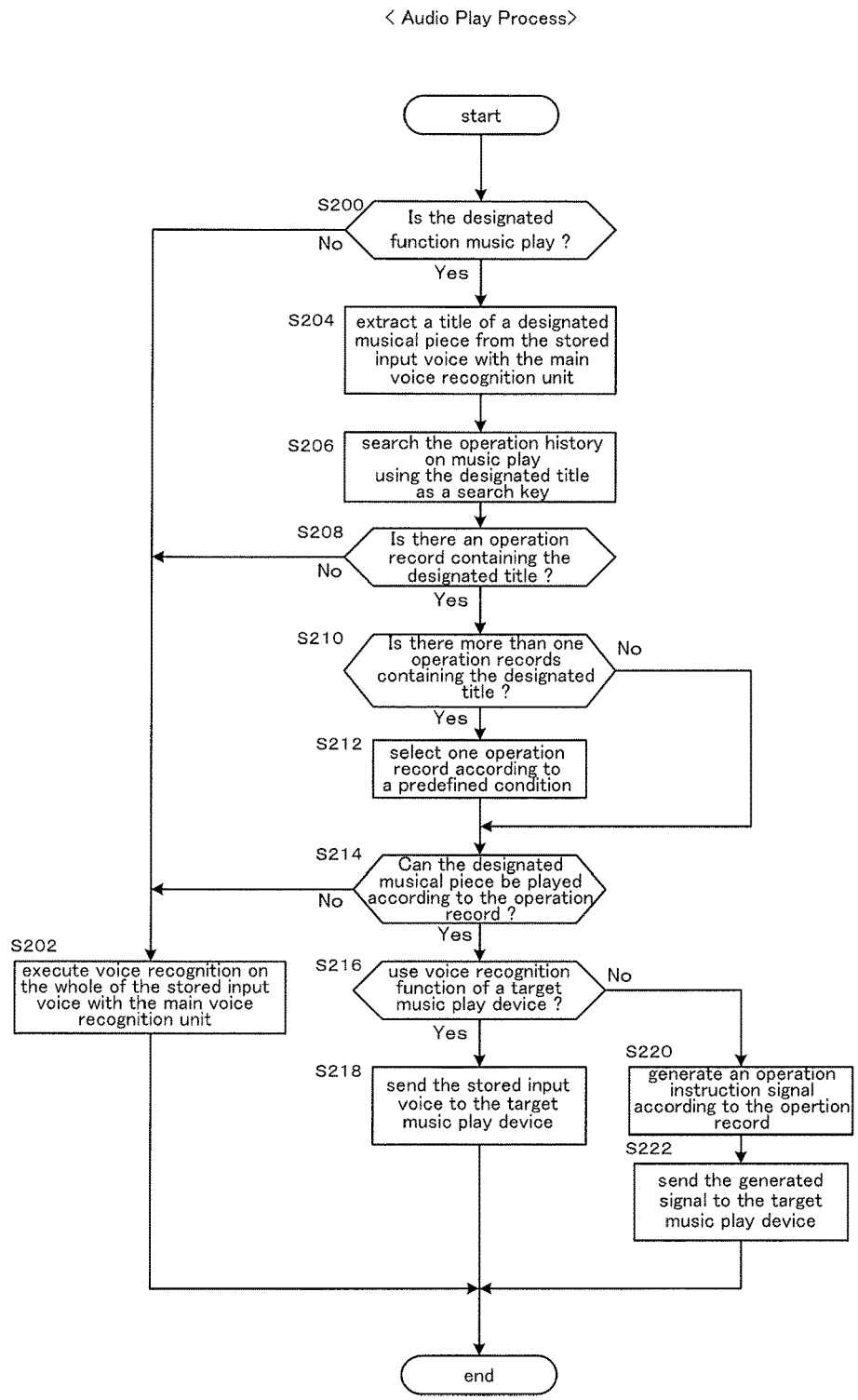
FIG. 8 is a flow diagram showing a procedure of the Audio Play Process in the flow diagram shown in FIG. 7.

And then, the selection of the one operation record as in step S212 in FIG. 8 is made, further based on the direct input information and the automatic play information.

Figure 10:
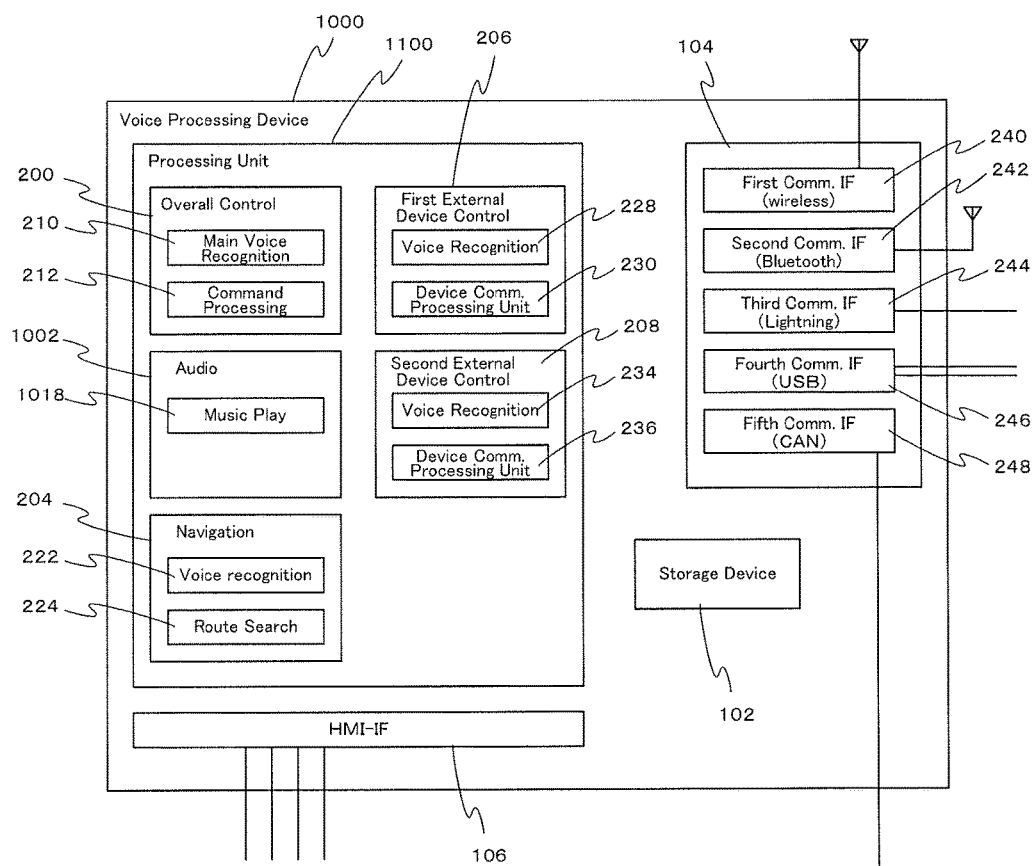
FIG. 10 shows a configuration of the voice processing device according to the second embodiment.

FIG. 10 shows a configuration of the voice processing device according to the second embodiment of the present invention. Here, in FIG. 10, the same elements as those of the voice processing device 10 according to the first embodiment shown in FIG. 2 is denoted by the same reference numerals as those in FIG. 2 and the above description about the voice processing device 10 is applied to (or incorporated in) those same elements.

The voice processing unit 1000 has a configuration similar to that of the voice processing device 10, but is different in having a processing unit 1100 instead of the processing unit 100. The processing unit 1100 has a configuration similar to that of the processing unit 100, but is different in having an overall control unit 1010 and an audio unit 1002 instead of the overall control unit 200 and the audio unit 202, respectively. The audio unit 1002 has a configuration similar to that of the audio unit 202, but is different from the unit 202 in not having any voice recognition unit and in having a music play unit 1018 instead of the music play unit 218. The music play unit 1018 has a configuration similar to that of the music play unit 218, but is different from the unit 218 in not performing any operation related to a voice recognition function.

And, the overall control unit 1010 has a configuration similar to that of the overall control unit 200, but is different in having a command processing unit 1012 instead of the command processing unit 212.

The command processing unit 1012 has a configuration similar to the command processing unit 212 and performs operations similar to those of the command processing unit 212, but further, obtains the direct input operation information (i.e., information of operation executed by any one of the first, second, third, and fourth external devices 110, 112, 114, 116 based on a direct input to the corresponding external device) from the corresponding external device. And then, the command processing unit 1012 stores as the operation history into the storage device 102 the operation information including the input voice command or a part of the input voice command and/or the input operation or a part of the input operation (e.g., a title of a designated musical piece for music play operation, a place name of destination used for a route search in navigation operation) associated with details of operation performed by the corresponding external device based on said voice command and said input operation. Here, the operation information constituting the operation history includes "direct input" information indicative of whether an operation performed by any one of the first to fourth external devices is based on a direct input to the corresponding external device. The command processing unit 1012 may obtain the direct input operation information at predetermined time intervals or at a time when the corresponding one of the external devices 110 to 116 gets connected to the communication IF 104, and then the unit 1012 updates the operation history stored in the storage device 102.

Further, when a musical piece gets played anew, the command processing unit 1012 obtains from the corresponding music play device the automatic play information indicative of whether the musical piece gets played automatically because of e.g., said musical piece being contained in a music album, and includes the obtained automatic play information in the operation information constituting the operation history.

FIG. 11 shows an example of the operation history of the music play operation which is made by the command processing unit 1012. As can be seen in the rightmost two columns of the table shown in the figure, the operation information constituting the operation history of the music play operation in the present embodiment includes the above described "Direct Input" information and "Automatic Play" information.

Figure 12:
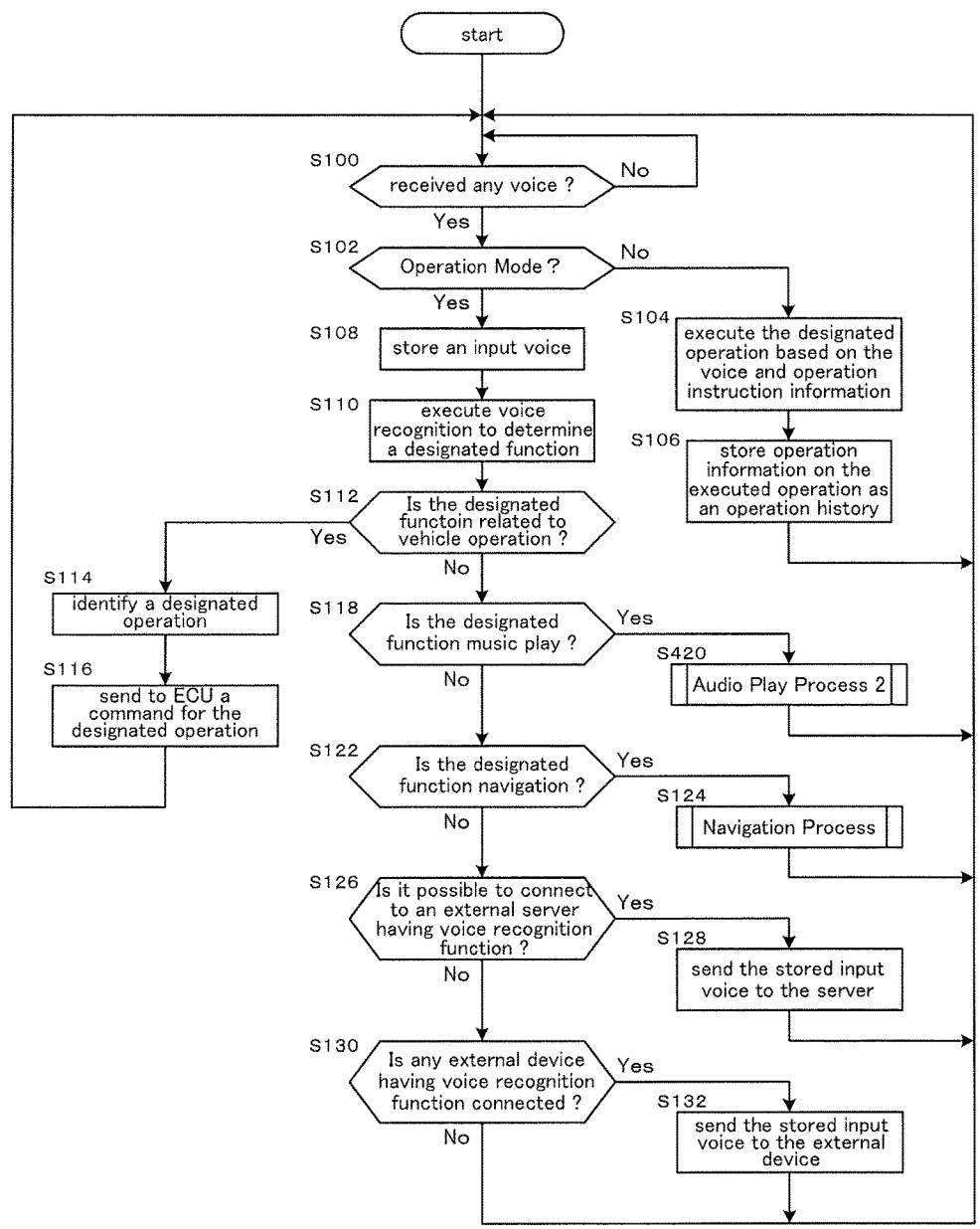
FIG. 12 is a flow diagram showing a process procedure in the overall control unit in the voice processing device shown in FIG. 10.

The command processing unit 1012 is further different from the command processing unit 212 in executing a process as shown in FIG. 12 instead of that shown in FIG. 7. The process shown in FIG. 12 is similar to that of FIG. 7, but different in executing an Audio Play Process 2 (detailed in FIG. 13) in step S420 instead of the Audio Play Process (FIG. 8) in step S120. Here, in FIGS. 12 and 13, the steps in which the same processing is performed as that performed in the steps shown in FIGS. 7 and 8 are denoted by the same reference numerals as those in FIGS. 7 and 8, and the above description about FIGS. 7 and 8 is applied to (or incorporated in) the steps in FIGS. 12 and 13 denoted by the same reference numerals as those in FIGS. 7 and 8.

Figure 13:
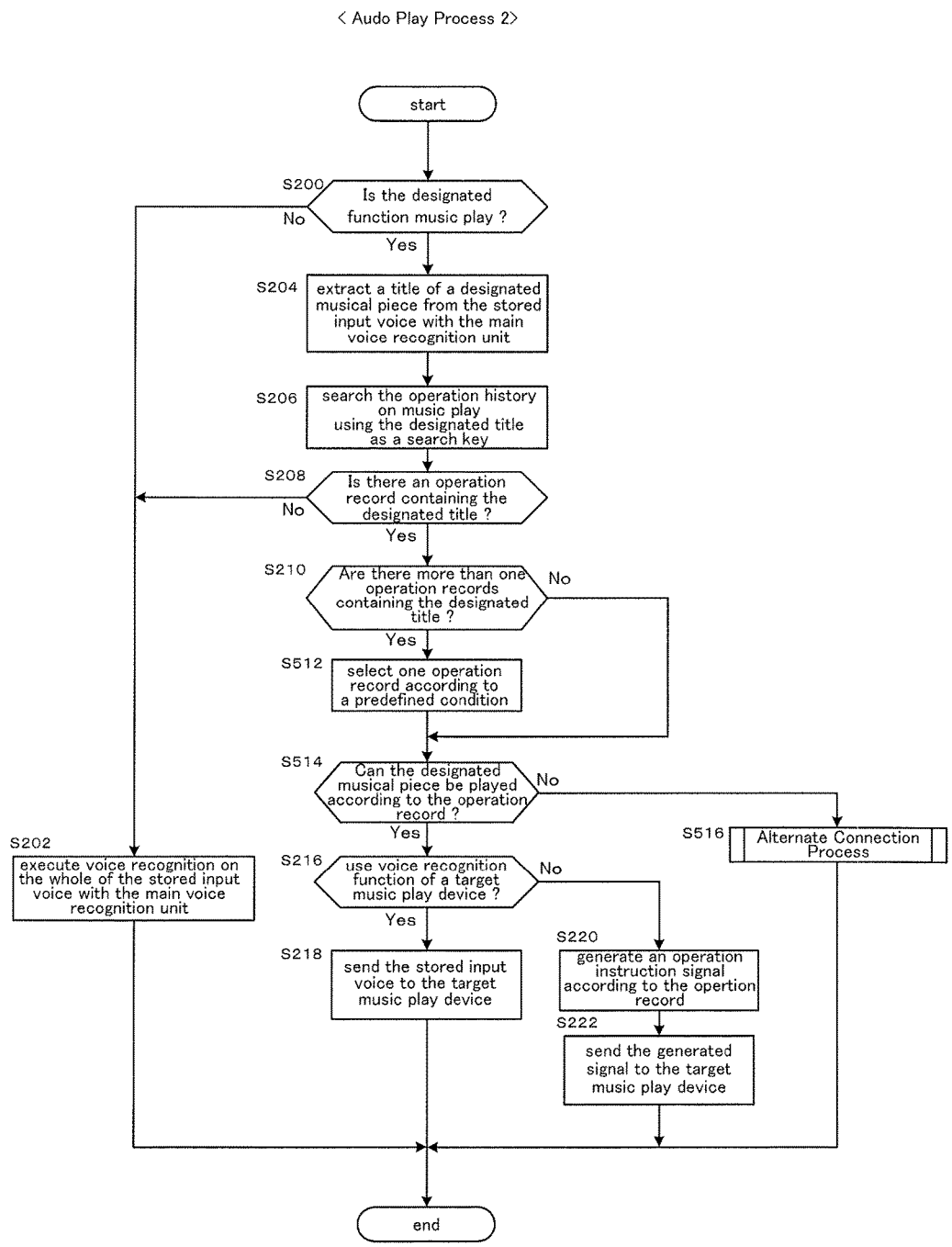
FIG. 13 is a flow diagram showing a procedure of the Audio Play Process 2 in the flow diagram shown in FIG. 12.

The Audio Play Process 2 shown in FIG. 13 is similar to the Audio Play Process shown in FIG. 8, but is different in that steps S512 and S514 are executed instead of steps S212 and S214, and a step S516 is added.

Next, description will be given of portions of the Audio Play Process 2 in FIG. 13, which are different from the Audio Play Process in FIG. 8, namely, steps S512, S514, and S516 in FIG. 13.

If in step S210 it is determined that more than one operation record containing the title of the designated musical piece is extracted from the operation history (S210, Yes), the command processing unit 1012 selects one operation record from the extracted operation records according to a predefined condition, based on information indicated in the columns "Voice Recognition Function", "Automatic Play", and "Direct Input" in addition to the information in the columns "Frequency" and/or "Last Date of Use" shown in FIG. 11 (S512).

Here, the predefined condition may include, for example, a condition specifying that the operation record about an operation performed based on any voice recognition operation (i.e, the operation record having an indication other than "Not Used" in the column "Voice Recognition Function" of the operation history shown in FIG. 11) is preferentially selected over the operation record of an operation performed not based on a voice recognition operation (i.e., an operation record having "Not Used" in the column "Voice Recognition Function", which means the operation record of an operation performed according to a manual input operation through the operation switch 176 and/or the touch panel of the display 174).

And, the predefined condition may include a condition specifying that the operation record indicating that the played musical piece (a musical piece having a title indicated in the column "Title of Musical Piece" of the operation history shown in FIG. 11) is not one played automatically (i.e., the operation record having "No" in the column "Automatic Play") is preferentially selected over the operation record indicating that the played musical piece is one which was played automatically (i.e., the operation record having "Yes" in the column "Automatic Play").

Further, the predefined condition may include a condition specifying that the operation record of the operation information based on information other than that obtained from any one of the first, second, third, and fourth external devices 110, 112, 114, 116 (i.e., the operation record having "No" in the column "Direct Input") is preferentially selected over the operation record of the operation information based on information obtained from any one of the first, second, third, and fourth external devices 110, 112, 114, 116 (i.e., the operation record having "Yes" in the column "Direct Input" of the operation history shown in FIG. 11).

If in step S514 it is determined to be impossible to play the designated musical piece according to the extracted operation record (S514, No), the command processing unit 1012 executes an Alternate Connection Process (S516), and terminates the Audio Play Process 2.

Figure 14:
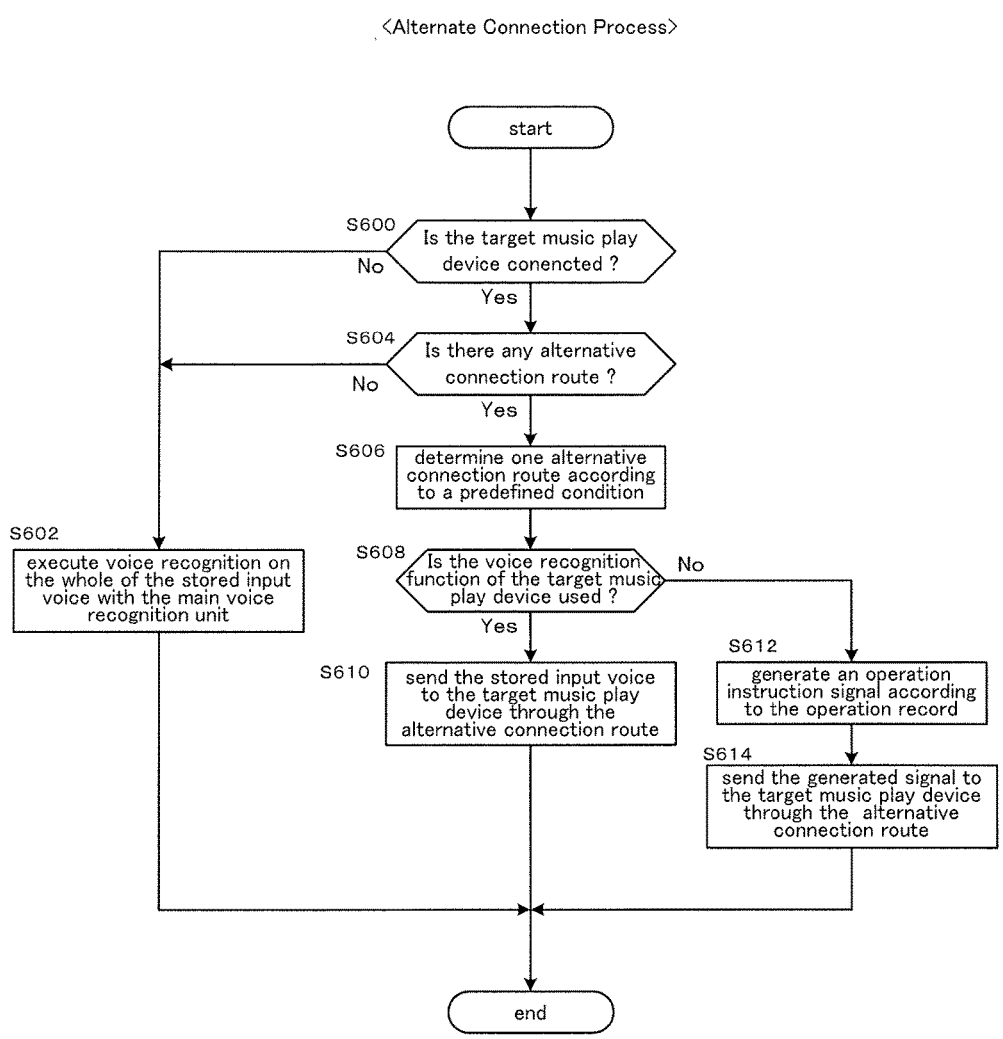
FIG. 14 is a flow diagram showing a procedure of the Alternate Connection Process in the flow diagram shown in FIG. 13.

Next, a procedure of the Alternate Connection Process in step S516 of FIG. 13 will be described with reference to a flow diagram shown in FIG. 14.

When processing starts, the command processing unit 1012 determines first whether the music play device to be used (hereinafter also referred to as a "target music play device") is connected to the communication IF 104 (S600), and if no (S600, No), the unit 1012 executes voice recognition with the main voice recognition unit 210 on the whole input voice stored in step S108 into the storage device 102 (S602) and terminates this Alternate Connection Process. Alternatively or additionally, in step S602, if it is possible to establish a connection to any external server having a voice recognition function through the first communication IF 240, the input voice stored in the storage device 102 at step S108 may be sent to the external server to perform voice recognition on the input voice.

If in step S600 the target music play device is determined to be connected to the communication IF 104 (S600, Yes), it is determined whether a communication connection can be established to the target music play device through any communication route (i.e., any alternative communication route) available instead of the communication route indicated in the operation record extracted at step S206 or S512 (S604). This determination may be made by, for example, sending a signal requesting an ID code to each of the devices connected to the first, second, third, and fifth communication IF 240, 242, 244, 246, 248, and determining whether an ID code matched with that of the target music play device is included in the ID codes sent from the devices. That is, if the ID code of the target music play device is included in the ID codes sent from the devices, it can be determined that the connection route through which the ID code matched with that of the target music play device was sent is available as an alternative connection route.

And, if it is determined to be impossible to establish the communication connection to the target music play device using any alternative connection route (S604, No), the Alternate Connection Process terminates after executing a step S602. On the other hand, if it is determined to be possible to establish the communication connection to the target music play device using any alternative connection route (S604, Yes), one specific alternative connection route is selected for use according to a predefined condition (S606).

The predefined condition may be, for example, one specifying "if the corresponding operation record indicates an operation in which any one of the first, second, third, and fourth external devices 110, 112, 114, 116 is used as the music play device and the voice recognition function of the music play device is used, then select as the alternative connection route any connection route that can enable use of the voice recognition function of the music play device." For example, seeing the operation history shown in FIG. 11, in the operation record having "Title 2" in the column "Title of Musical Piece", the second external device 112 having an ID code of ID2-002 is used as the music play device (see the column "Music Play") and the music play operation is performed based on the voice recognition function of the music play device, i.e., the second external device 112 (see the column "Voice Recognition Function"). In this case, if the second external device 112 having an ID code of ID2-002 is not connected to the fourth communication IF 246, but, for example, is connected to the second communication IF 242 which is e.g., a Bluetooth communication interface capable of enabling a voice recognition function such as BT Audio and BT SiRi, then without using as a platform the audio unit 1002 having no voice recognition unit, the connection route through the second communication IF 242 which uses as a platform the second external device control unit 208 capable of enabling the voice recognition function of the second external device 112 is selected as the alternative connection route for use.

Then, the command processing unit 1012 determines whether the extracted operation record indicates that any voice recognition function is used to perform the music play operation (S608). As an example, if the operation record is extracted from the operation history shown in FIG. 11, this determination may be made based on the information indicated in the fourth column from the right, "Voice Recognition Function".

If the use of any voice recognition function is designated (S608, Yes), the input voice stored in step S108 of FIG. 7 into the storage device 102 is sent to a device or unit having the voice recognition function designated by the extracted operation record (e.g., the device or unit indicated in the fourth column from the right, "Voice Recognition Function", in the table of the operation history shown in FIG. 11) through the alternative connection route selected in step S606 (S610). And then, the Alternate Connection Process terminates. Thereby, the music play device having received the input voice may execute a voice recognition process on the received input voice and can play the designated musical piece according to the command(s) contained in the input voice.

If in step S608 a use of any voice recognition function is not designated (S608, No), an operation instruction signal for playing the designated musical piece with the designated music play device is generated according to the extracted operation record (S612). Then, the generated operation instruction signal is sent to the designated music play device through the alternative connection route elected in step S606 (S614), and the Alternate Connection Process terminates.

As described above, in each of the voice processing devices 10, 1000 according to the first and second embodiments, contents of an input voice is recognized with the main voice recognition unit 210 and a command(s) contained in the input voice is extracted. And, based on the extracted command and/or the Operation Instruction Information provided through the operation switch 176 and/or the touch screen of the display 174, each of the voice processing devices 10, 1000 controls the music play operation and/or navigation operation performed by itself and/or instructs any of the first, second, third, and fourth external device 110, 112, 114, 116 to execute the music play operation and/or navigation operation. Further, each of the command processing units 212, 1012 stores in the storage device 102 as the operation history the operation information associating the Operation Instruction Information or a part of the Operation Instruction Information and the command or a part of the command (e.g., a title of a musical piece to be played in the music play operation and/or a place name of a destination to be used in the navigation operation) with details of the operation (e.g., the music play operation and/or the navigation operation) performed by itself and/or by any of the first, second, third, and fourth external devices 110, 112, 114, 116 according to the Operation Instruction Information and/or the command And, when any voice is input anew, each of the command processing units 212, 1012 extracts a command from the input voice with the main voice recognition unit 210 and extracts from the operation history the operation record containing the extracted command or a part of the extracted command And then, based on the extracted command and the extracted operation record, each of the units 212, 1012 controls operations of its own and/or instructs any of the first, second, third, and fourth external devices 110, 112, 114, 116 to operate.

Thereby, while enabling the use of a simplified voice command (e.g., a voice command only designating a title of a musical piece or a place name of a destination), each of the voice processing devices 10, 1000 may prevent conflict among the operations of the voice recognition functions of its own (e.g., those performed by the voice recognition units 210, 216, 222, 228, 234) and the voice recognition functions of the external devices (e.g., those performed by the voice recognition unit 140, 142 of the first, second external devices 110, 112) and manage properly the execution of those functions.

REFERENCE SIGN LIST 10, 1000: voice processing device
100, 130, 132, 134, 136, 1100: processing unit
102: storage device
104, 120, 122, 124, 126: communication interface (communication IF or comm IF)
106: HMI interface (HMI-IF)
110: first external device
112: second external device
114: third external device
116: fourth external device
140, 142, 216, 222, 228, 234: voice recognition unit
144, 146, 150, 152: function control unit
160a, 160b: ECU
170: microphone
172: loudspeaker
174: display
176: operation switch
200, 1010: overall control unit
202, 1002: audio unit
204: navigation unit
206: first external device control unit
208: second external device control unit
210: main voice recognition unit
212, 1012: command processing unit
218, 1018: music play unit
224: route search unit
230, 236: device communication processing unit
240: first communication interface (first communication IF or first comm IF)
242: second communication interface (second communication IF or second comm IF)
244: third communication interface (third communication IF or third com. IF)
246: fourth communication interface (fourth communication IF or fourth comm IF)
248: fifth communication interface (fifth communication IF or fifth comm IF)

What is claimed is:

1. A voice processing device comprising:
a first voice recognition unit for recognizing contents of an input voice to extract a command contained in the input voice; and
a control unit for controlling operation of the voice processing device itself or instructing an external devices to operate, based on the extracted command or operation instruction information provided;
wherein the control unit is configured to:
store, in a storage device as an operation history, operation information associating the command or a part of the command or the operation instruction information or a part of the operation instruction information with details of the operation which is performed by the voice processing device or the external device based on the command or the operation instruction information, and
when a voice is input anew,
if the command extracted by the first voice recognition unit with respect to the new voice is a simplified voice command, determine a function designated by the simplified voice command, determine either one of the voice processing device itself or the external device corresponding to the function, and extract from the operation history an operation record containing the simplified voice command or a part of the simplified voice command, the operation record being a record of the operation information; and
control operation of the voice processing device itself or instruct the external device to operate, based on said extracted simplified voice command and the extracted operation record,
the voice processing device further comprising at least one second voice recognition unit other than the first voice recognition unit,
wherein the control unit controls operation of the voice processing device itself by sending the input voice to one of the second voice recognition units,
wherein when a number of the extracted operation records are more than two, the control unit selects one operation record among the extracted operation records according to a predefined condition, and controls operation of the determined voice processing device itself corresponding to the function or instructs the determined external device corresponding to the function to operate, based on the extracted simplified voice command and the selected one operation record, wherein the operation information includes information about whether or not a corresponding operation is performed based on a voice recognition function of any of the second voice recognition units, and wherein the predefined condition is one specifying that the operation record about an operation performed based on any voice recognition function is preferentially selected over the operation record about an operation performed not based on any voice recognition function.

2. The voice processing device according to claim 1, wherein the operation instruction information is provided from an operation input unit through which information is entered by a user operation.

3. The voice processing device according to claim 1, wherein the control unit operates the external device by:
sending an operation instruction signal to instruct the external device to operate, or
sending the input voice to the external device if the external device has a voice recognition function and is connected with the voice processing device so that the voice processing device can send the voice.

4. The voice processing device according to claim 1, wherein the operation information is related to a music play operation and includes information about whether a musical piece is played automatically,
wherein the predefined condition is one specifying that the operation record indicating that a played musical piece is not one which was played automatically is preferentially selected over the operation record indicating that a played musical piece is one which was played automatically.

5. The voice processing device according to claim 1, wherein the control unit is further configured to:
obtain, from the external device, information about details of operation performed by the external device in response to a voice command directly input to the external device or a user input operation directly performed to the external device; and
store, in the storage device as the operation history, the operation information associating the voice command or a part of the voice command or information about the user input operation or a part of information about the user input operation with details of the operation which is performed by the external device based on the voice command or the user input operation.

6. The voice processing device according to claim 5, wherein the predefined condition is one specifying that the operation record other than the operation record based on information obtained from the external device is preferentially selected over the operation record based on information obtained from the external device.

7. The voice processing device according to claim 1, wherein the operation information includes identification information of the external device used for a corresponding operation and information about a connection route to said external device,
wherein the control unit is configured to:
determine whether it is possible to send an operation instruction to the external device identified by the identification information in the extracted operation record, through the same connection route as that indicated in the extracted operation record, and
if it is not possible, select one alternative connection route according to a predefined condition and instruct the external device to operate using the selected alternative connection route.

8. The voice processing device according to claim 7, wherein the operation information includes information about whether a corresponding operation is performed based on the voice recognition function of the external device,
wherein if the extracted operation record indicates that the corresponding operation is performed based on the voice recognition function of the external device, then a connection route capable of enabling the voice recognition function of the external device is selected as the alternative connection route.

9. The voice processing device according to claim 1, wherein the predefined condition is based on information of frequency in the operation history.

10. The voice processing device according to claim 1, wherein the predefined condition is based on information of last date of use in the operation history.

11. A voice processing device comprising:
a first voice recognition unit for recognizing contents of an input voice to extract a command contained in the input voice; and
a control unit for controlling operation of the voice processing device itself or instructing an external devices to operate, based on the extracted command or operation instruction information provided;
wherein the control unit is configured to:
store, in a storage device as an operation history, operation information associating the command or a part of the command or the operation instruction information or a part of the operation instruction information with details of the operation which is performed by the voice processing device or the external device based on the command or the operation instruction information, and
when a voice is input anew,
if the command extracted by the first voice recognition unit with respect to the new voice is a simplified voice command, determine a function designated by the simplified voice command, determine either one of the voice processing device itself or the external device corresponding to the function, and extract from the operation history an operation record containing the simplified voice command or a part of the simplified voice command, the operation record being a record of the operation information; and
control operation of the voice processing device itself or instruct the external device to operate, based on said extracted simplified voice command and the extracted operation record,
the voice processing device further comprising at least one second voice recognition unit other than the first voice recognition unit,
wherein the control unit controls operation of the voice processing device itself by sending the input voice to one of the second voice recognition units,
wherein when a number of the extracted operation records are more than two, the control unit selects one operation record among the extracted operation records according to a predefined condition, and controls operation of the determined voice processing device itself corresponding to the function or instructs the determined external device corresponding to the function to operate, based on the extracted simplified voice command and the selected one operation record, wherein the operation information is related to a music play operation and includes information about whether or not a musical piece is played automatically, and wherein the predefined condition is one specifying that the operation record indicating that a played musical piece is not one which was played automatically is preferentially selected over the operation record indicating that a played musical piece is one which was played automatically.

\* \* \* \* \*